(12) United States Patent
Wakabayashi

(10) Patent No.: US 12,550,048 B2
(45) Date of Patent: Feb. 10, 2026

(54) INFORMATION PROCESSING APPARATUS CAPABLE OF REDUCING ERRONEOUS OPERATION OF WIRELESS COMMUNICATION, METHOD OF CONTROLLING SAME, AND STORAGE MEDIUM

(71) Applicant: CANON KABUSHIKI KAISHA, Tokyo (JP)

(72) Inventor: Mizuki Wakabayashi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 428 days.

(21) Appl. No.: 18/321,179

(22) Filed: May 22, 2023

(65) Prior Publication Data

US 2023/0388902 A1    Nov. 30, 2023

(30) Foreign Application Priority Data

May 25, 2022    (JP) .................................. 2022-085376

(51) Int. Cl.
*H04W 48/10*    (2009.01)
*H04W 48/16*    (2009.01)

(52) U.S. Cl.
CPC ........... *H04W 48/10* (2013.01); *H04W 48/16* (2013.01)

(58) Field of Classification Search
CPC ..... H04W 48/10; H04W 48/16; H04W 28/18; H04W 28/0861; H04W 76/10; Y02D 30/70; G06F 3/1292; H04L 1/1642
See application file for complete search history.

(56) References Cited

U.S. PATENT DOCUMENTS

| 11,595,886 | B2 | 2/2023 | Morimoto | |
|---|---|---|---|---|
| 2014/0268222 | A1* | 9/2014 | Inoue | G06F 3/1292 |
| | | | | 358/1.15 |
| 2018/0054847 | A1* | 2/2018 | Cariou | H04W 28/0861 |
| 2022/0279387 | A1* | 9/2022 | Tamura | H04W 28/18 |
| 2023/0009565 | A1* | 1/2023 | Gan | H04L 1/1642 |
| 2025/0261252 | A9* | 8/2025 | Fisher | H04W 76/10 |

FOREIGN PATENT DOCUMENTS

| JP | 2019216378 A | 12/2019 |
|---|---|---|
| JP | 2021158545 A | 10/2021 |

* cited by examiner

*Primary Examiner* — Vinncelas Louis
(74) *Attorney, Agent, or Firm* — ROSSI, KIMMS & McDOWELL LLP

(57) ABSTRACT

An information processing apparatus capable of reducing an erroneous operation when wireless communication is performed. The information processing apparatus includes a first communication unit that performs wireless communication with a first access point for a first wireless communication method compliant with IEEE 802.11ah, a second communication unit that performs wireless communication with a second access point for a second wireless communication method capable of performing communication at a higher speed than the first wireless communication method, and a controller capable of performing control, in a state in which the first access point and the second access point have been started such that wireless communication can be performed, such that a service set identifier (SSID) of one access point of the first access point and the second access point is broadcast, and an SSID of the other access point is inhibited from being broadcast.

9 Claims, 17 Drawing Sheets

| ADMINISTRATOR MODE |
|---|
| Select an item to be set. |
| Direct connection |
| |
| |
| RETURN |

| ADMINISTRATOR MODE |
|---|
| Select a mode. |
| Normal mode |
| Power saving mode |
| |
| RETURN |

| ADMINISTRATOR MODE | |
|---|---|
| Normal mode | ON OFF |
| All-time setting | ON OFF |
| | |
| RETURN | COMPLETE |

| ADMINISTRATOR MODE | |
|---|---|
| Norm | |
| Cont | The setting is completed. |
| | Close |
| RETURN | COMPLETE |

TABLE 1

| No | SCREEN ON DISPLAY | PRIORITY SETTING | BROADCAST |
|---|---|---|---|
| 1 | SCREEN 404 | NORMAL MODE | HIGH-SPEED WIRELESS COMMUNICATION STANDARD 103 |
| 2 | SCREEN 404 | POWER SAVING MODE | HIGH-SPEED WIRELESS COMMUNICATION STANDARD 103 |
| 3 | SCREEN 405 | NORMAL MODE | LOW-SPEED WIRELESS COMMUNICATION STANDARD 104 |
| 4 | SCREEN 405 | POWER SAVING MODE | LOW-SPEED WIRELESS COMMUNICATION STANDARD 104 |
| 5 | OTHER | NORMAL MODE | HIGH-SPEED WIRELESS COMMUNICATION STANDARD 103 |
| 6 | OTHER | POWER SAVING MODE | LOW-SPEED WIRELESS COMMUNICATION STANDARD 104 |

FIG. 12
TABLE 2

| No | SCREEN ON DISPLAY | CONTINUOUS SETTING OF HIGH-SPEED WIRELESS COMMUNICATION STANDARD 103 | CONTINUOUS SETTING OF LOW-SPEED WIRELESS COMMUNICATION STANDARD 104 | BROADCAST |
|---|---|---|---|---|
| 1 | SCREEN 404 | OFF | OFF | HIGH-SPEED WIRELESS COMMUNICATION STANDARD 103 |
| 2 | SCREEN 404 | OFF | ON | HIGH-SPEED WIRELESS COMMUNICATION STANDARD 103 & LOW-SPEED WIRELESS COMMUNICATION STANDARD 104 |
| 3 | SCREEN 404 | ON | OFF | HIGH-SPEED WIRELESS COMMUNICATION STANDARD 103 |
| 4 | SCREEN 404 | ON | ON | HIGH-SPEED WIRELESS COMMUNICATION STANDARD 103 & LOW-SPEED WIRELESS COMMUNICATION STANDARD 104 |
| 5 | SCREEN 405 | OFF | OFF | LOW-SPEED WIRELESS COMMUNICATION STANDARD 104 |
| 6 | SCREEN 405 | OFF | ON | LOW-SPEED WIRELESS COMMUNICATION STANDARD 104 |
| 7 | SCREEN 405 | ON | OFF | HIGH-SPEED WIRELESS COMMUNICATION STANDARD 103 & LOW-SPEED WIRELESS COMMUNICATION STANDARD 104 |
| 8 | SCREEN 405 | ON | ON | HIGH-SPEED WIRELESS COMMUNICATION STANDARD 103 & LOW-SPEED WIRELESS COMMUNICATION STANDARD 104 |
| 9 | OTHER | OFF | OFF | — |
| 10 | OTHER | OFF | ON | LOW-SPEED WIRELESS COMMUNICATION STANDARD 104 |
| 11 | OTHER | ON | OFF | HIGH-SPEED WIRELESS COMMUNICATION STANDARD 103 |
| 12 | OTHER | ON | ON | HIGH-SPEED WIRELESS COMMUNICATION STANDARD 103 & LOW-SPEED WIRELESS COMMUNICATION STANDARD 104 |

INFORMATION PROCESSING APPARATUS CAPABLE OF REDUCING ERRONEOUS OPERATION OF WIRELESS COMMUNICATION, METHOD OF CONTROLLING SAME, AND STORAGE MEDIUM

BACKGROUND OF THE INVENTION

Field of the Invention

The present invention relates to an information processing apparatus that is capable of reducing an erroneous operation of wireless communication, a method of controlling the same, and a storage medium.

Description of the Related Art

In recent years, a mechanism referred to as the "Internet of Things (IoT)", in which a variety of devices are connected to the Internet, has started to be widely used. In the IoT, as the wireless communication standard for connecting a device to the Internet, there are known a variety of standards (see e.g. Japanese Laid-Open Patent Publication (Kokai) No. 2021-158545). As disclosed in Japanese Laid-Open Patent Publication (Kokai) No. 2021-158545, one of the wireless standards is IEEE 802.11ah (hereinafter simply referred to as "11ah"). Further, there is known an apparatus including not only an antenna for a conventional wireless communication standard, but also an antenna supporting the 11ah standard (see e.g. Japanese Laid-Open Patent Publication (Kokai) No. 2019-216378). Therefore, it assumed that an image forming apparatus (image forming apparatus/information processing apparatus), such as a multifunction peripheral (MFP), also supports not only the conventional wireless communication standard, but also the 11ah standard or the like.

Incidentally, in a case where an image forming apparatus and an access point are connected for communication, a service set identifier (SSID) is used for connection processing. Therefore, in a case where the image forming apparatus supports a plurality of wireless standards, one of SSIDs set on a standard basis is used. To facilitate the connection processing, it is assumed to broadcast an SSID of the image forming apparatus. However, if SSIDs for both of the conventional wireless standard and the 11ah standard are simultaneously broadcast, both of the SSIDs are displayed, and a user cannot determine which of the SSIDs is to be used, and this may cause an erroneous operation.

SUMMARY OF THE INVENTION

The present invention provides an information processing apparatus that is capable of reducing an erroneous operation when wireless communication is performed, a method of controlling the same, and a storage medium.

In a first aspect of the present invention, there is provided an information processing apparatus including a first communication unit configured to perform wireless communication with a first access point for a first wireless communication method compliant with IEEE 802.11ah, a second communication unit configured to perform wireless communication with a second access point for a second wireless communication method capable of performing communication at a higher speed than the first wireless communication method, and a control unit configured to be capable of performing control, in a state in which the first access point and the second access point have been started such that wireless communication can be performed, such that a service set identifier (SSID) of one access point of the first access point and the second access point is broadcast, and an SSID of the other access point is inhibited from being broadcast.

In a second aspect of the present invention, there is provided a method of controlling an information processing apparatus, including performing wireless communication with a first access point for a first wireless communication method compliant with IEEE 802.11ah, performing wireless communication with a second access point for a second wireless communication method capable of performing communication at a higher speed than the first wireless communication method, and performing control, in a state in which the first access point and the second access point have been started such that wireless communication can be performed, such that a service set identifier (SSID) of one access point of the first access point and the second access point is broadcast, and an SSID of the other access point is inhibited from being broadcast.

According to the present invention, it is possible to reduce an erroneous operation when wireless communication is performed.

Further features of the present invention will become apparent from the following description of exemplary embodiments (with reference to the attached drawings).

BRIEF DESCRIPTION OF THE DRAWINGS

FIGS. 10A to 10D are diagrams each showing an example of a screen of an administrator mode, which is displayed on the console section of the image forming apparatus, in the second embodiment.

FIG. 11 is a table showing examples of a combination of a screen displayed on the console section of the image forming apparatus, a wireless communication mode set as a priority setting in advance, and a communication standard for which broadcasting is performed, when direct connection is selected by a user.

FIG. 12 is a table showing examples of a combination of a screen displayed on the console section, on/off of respective all-time settings of communication standards, and a communication standard or communication standards for which broadcasting is performed.

DESCRIPTION OF THE EMBODIMENTS

The present invention will now be described in detail below with reference to the accompanying drawings showing embodiments thereof. However, configurations described in the following embodiments are described only by way of example, and are by no means intended to limit the scope of the present invention. For example, components constituting the present invention each can be replaced by a desired component that can exhibit the same function. Further, a desired component may be added. Further, desired two or more components (features) of the embodiments can be combined.

Figure 1:
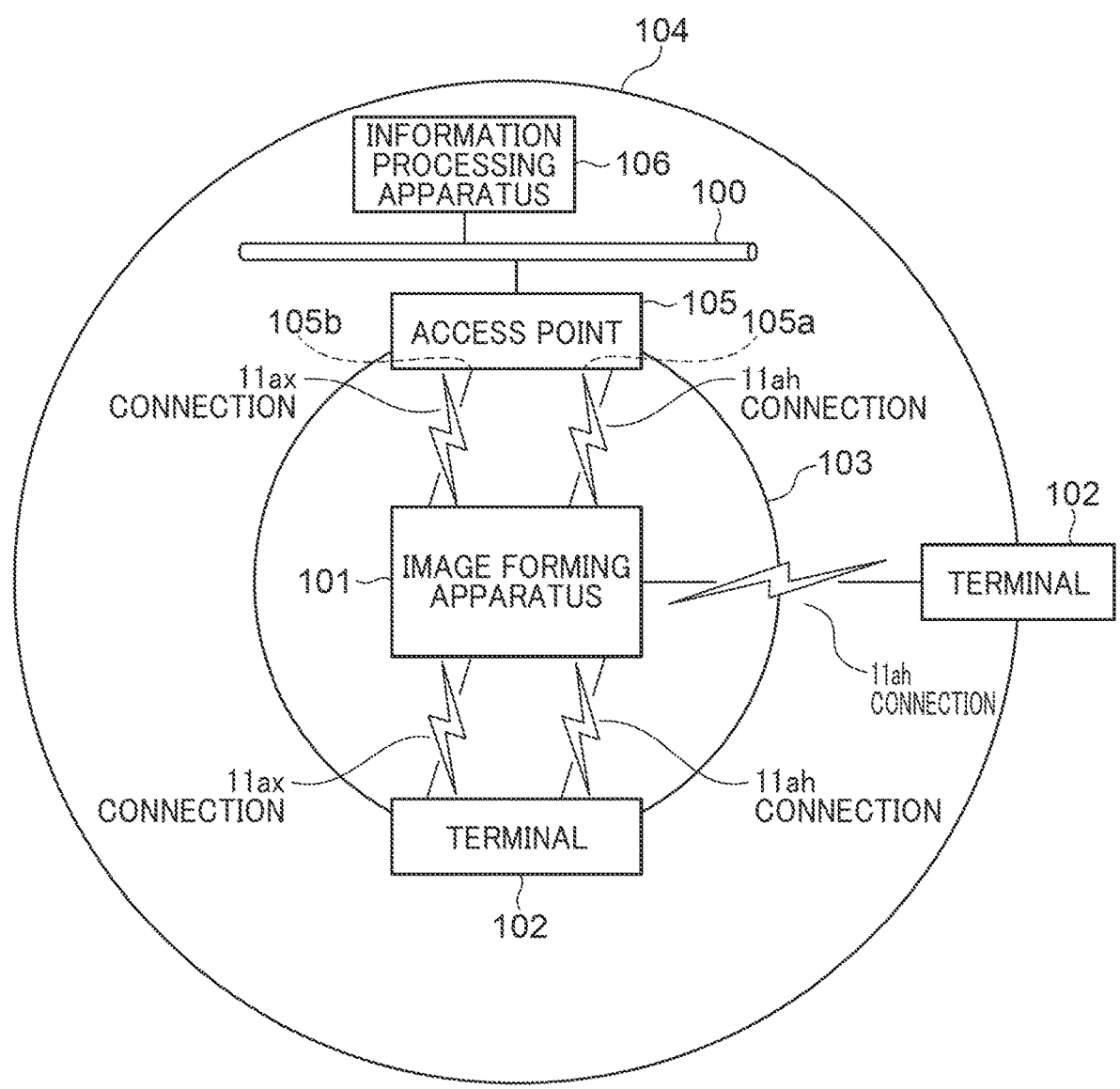
FIG. 1 is a block diagram showing a communication connection state between devices, in a first embodiment of the present invention.

A first embodiment of the present invention will be described below with reference to FIGS. 1 to 7B. FIG. 1 is a block diagram showing a communication connection state between devices in the first embodiment. An image forming apparatus 101 appearing in FIG. 1 is an information processing apparatus that performs processing of image formation and the like and is e.g. a multifunction peripheral (MFP). The image forming apparatus 101 supports a wireless communication standard 103 and a wireless communication standard 104. That is, the image forming apparatus 101 is capable of performing wireless LAN communications based on the wireless communication standard 103 and the wireless communication standard 104, respectively. The wireless communication standard 104 is a standard for performing wireless communication using a first wireless communication method compliant with IEEE 802.11ah (hereinafter sometimes simply referred to as "11ah"). The wireless communication standard 103 is a standard for performing wireless communication using a second wireless communication method capable of performing communication at a higher speed than the communication speed of the first wireless communication method. The second wireless communication method is not particularly limited, but for example, a method compliant with e.g. IEEE 802.11ax (hereinafter sometimes simply referred to as "11ax") is used. As for the data transfer rate, the wireless communication standard 103 is higher, and the wireless communication standard 104 is lower. As to a communicable range, the wireless communication standard 103 enables communication in a narrower range, and the wireless communication standard 104 enables communication in a wider range (see FIG. 1). Further, the wireless communication standard 104 can suppress power consumption to a level lower than that of the wireless communication standard 103.

As shown in FIG. 1, the image forming apparatus 101 has a function of enabling direct wireless connection (direct connection) to a mobile terminal (hereinafter simply referred to as the "terminal") 102, such as a smartphone or a tablet terminal. A user enables settings to use direct connection of the image forming apparatus 101, thereby making it possible to set a service set identifier (SSID) and a network key, displayed on a screen of the image forming apparatus 101, for the terminal 102. By thus performing the setting, the direct connection between the image forming apparatus 101 and the terminal 102 is made available.

Further, the image forming apparatus 101 has a function of enabling wireless connection to an information processing apparatus 106, such as a personal computer, via an access point 105 and a network 100. The user enables settings to use the infrastructure connection of the image forming apparatus 101, thereby making it possible to select an SSID of the access point 105 out of an SSID list displayed on the screen of the image forming apparatus 101 and input a network key. This enables the infrastructure connection of the image forming apparatus 101 to the network 100. This connection mode, i.e. the infrastructure connection mode supports the wireless communication standard 103 and the wireless communication standard 104. Therefore, the access point 105 has a first access point 105a of the first wireless communication method (11ah connection) and a second access point 105b of the second wireless communication method (11ax connection). The image forming apparatus 101 has, as its operation mode, a sleep mode in which power consumption is suppressed and a standby mode in which more power is consumed than in the sleep mode. In the standby mode, to process transmission and reception of a large volume of image data within a short time, it is preferable to use the high-speed wireless communication standard 103. On the other hand, in the sleep mode, it is preferable to use the wireless communication standard 104 which is low in power consumption until a print job execution command is received from the information processing apparatus 106.

Figure 2:
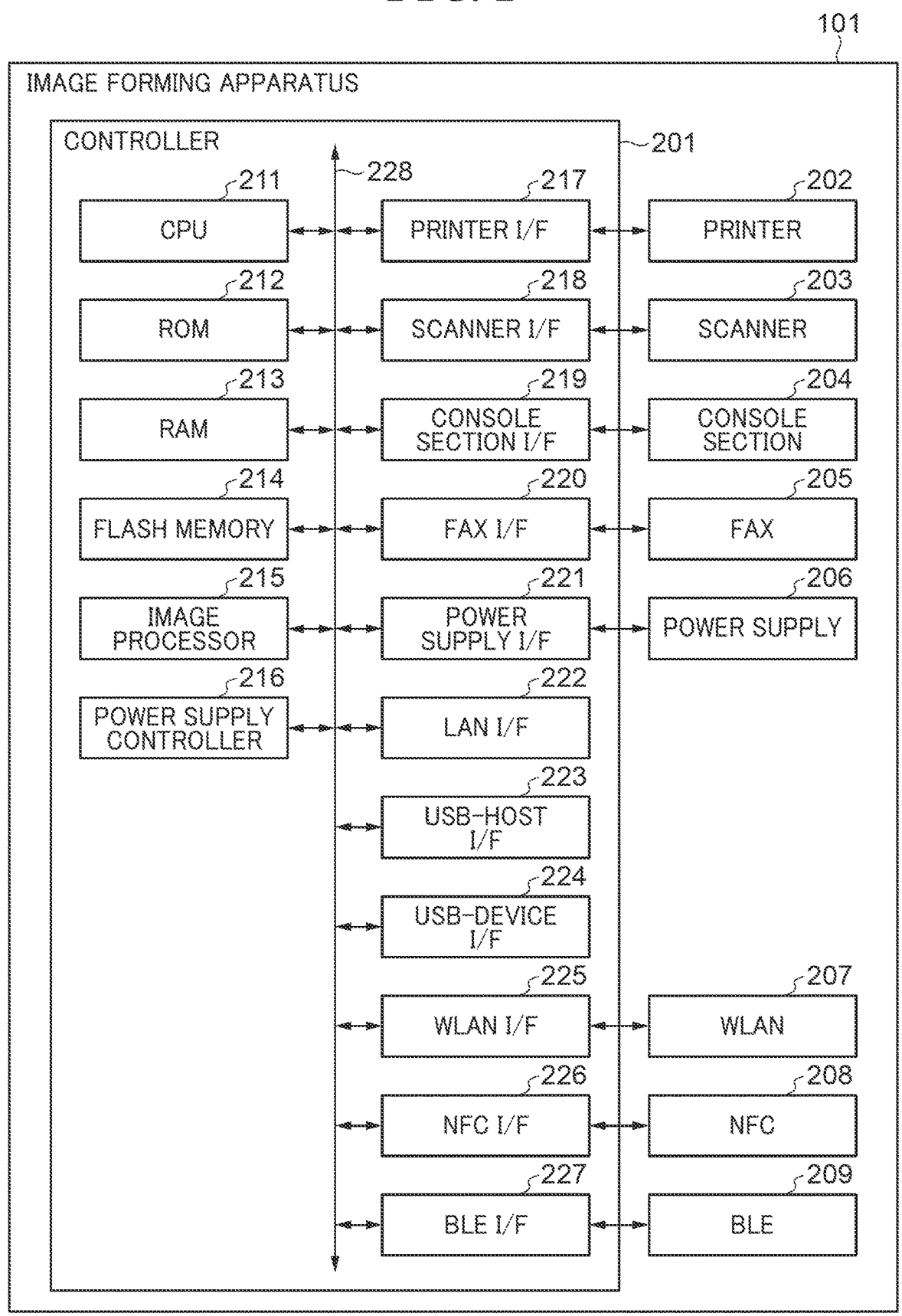
FIG. 2 is a block diagram showing a hardware configuration of an image forming apparatus.

FIG. 2 is a block diagram showing a hardware configuration of the image forming apparatus. As shown in FIG. 2, the image forming apparatus 101 includes a controller (control unit) 201, a printer 202, a scanner 203, a console section 204, a FAX 205, and a power supply 206. Further, the image forming apparatus 101 includes a wireless local area network (WLAN) 207, near field communication (NFC) 208, and Bluetooth low energy (BLE) 209. The controller 201 includes a CPU 211, a ROM 212, a RAM 213, a flash memory 214, an image processor 215, a power supply controller 216, a printer interface (I/F) 217, a scanner interface (I/F) 218, a console section interface (I/F) 219, a FAX interface (I/F) 220, and a power supply interface (I/F) 221. Further, the controller 201 includes a LAN interface (I/F) 222, a USB host interface (I/F) 223, a USB device interface (I/F) 224, a WLAN interface (I/F) 225, an NFC interface (I/F) 226, a BLE interface (I/F) 227, and a bus 228. Note that as described hereinafter, the terminal 102 is a control target for which broadcasting is controlled by the controller 201.

The CPU 211 controls the overall operation of the image forming apparatus 101 and transmits and receives signals to and from the components included in the controller 201 via the bus 228. The ROM 212 is a nonvolatile memory storing programs to be executed by the CPU 211 for starting up the image forming apparatus 101. The RAM 213 is a volatile memory used by the CPU 211 so as to load a variety of operation programs and execute the loaded programs. These programs include e.g. programs for causing the CPU 211 (computer) to execute a method of controlling the components and means of the image forming apparatus 101 (method of controlling the information processing apparatus). The flash memory 214 is a nonvolatile memory for storing a variety of programs for operating the image forming apparatus 101 and FAX image data. The image processor 215 converts read image data received from the scanner 203 and other image data to print image data. Examples of the other image data include image data received from an external device via the FAX interface 220, the LAN interface 222, the USB host interface 223, the USB device interface 224 or the WLAN interface 225. The power supply controller 216 controls electric power supplied to the components according to an operation mode of the image forming apparatus 101. The image forming apparatus 101 has the standby mode and the sleep mode, as its operation mode, as described above. The standby mode is a state in which electric power is supplied to the components of the image forming apparatus 101. The sleep mode is a state shifted from the standby mode, in which power consumption is low, and for example, power supply to the printer 202, the backlight of the console section 204, and the like is stopped. A condition for shifting to the sleep mode is detection of lapse of an auto-sleep time or pressing of a power saving key. A user can set the auto-sleep time based on product specifications of the image forming apparatus 101 as desired. A condition for shifting to the standby mode is, for example, detection of an input by the console section 204 or detection of an original by the scanner 203. The other conditions for shifting to the standby mode include detection of reception of a job via an external interface, such as the FAX interface 220, the LAN interface 222, the USB host interface 223, the USB device interface 224, or the WLAN interface 225. The printer interface 217 is connected to the printer 202 to transmit print image data, and transmit and receive a control signal associated with a print operation. The scanner interface 218 is connected to the scanner 203 to receive read image data, and transmit and receive a control signal associated with a reading operation. The console section interface 219 is connected to the console section 204 to receive input signals indicative of selection of a variety of function keys, execution/stop of a job, and on/off of a power supply key, from the console section 204, and transmit display image data to the console section 204. The FAX interface 220 is connected to the FAX 205 to transmit and receive image data and a control signal associated with a FAX operation. The power supply interface 221 is connected to the power supply 206 to transmit and receive a control signal according to the operation mode of the image forming apparatus 101. The LAN interface 222 is connected to the network 100 to receive print jobs and image data from a plurality of external apparatuses (e.g. the information processing apparatus 106), such as PCs, which are connected to the network 100. The USB host interface 223 is connected to an external device, such as a USB memory, to transmit and receive image data and the like. The USB device interface 224 is connected to an external apparatus (e.g. the information processing apparatus 106), such as a PC, to receive a print job and image data from the connected external apparatus. The WLAN interface 225 is connected to the WLAN 207 to transmit and receive image data and a control signal. The NFC interface 226 is connected to the NFC 208 to transmit and receive connection information (an SSID and a network key) data. The BLE interface 227 is connected to the BLE 209 to transmit and receive connection information, and perform control related to an advertising packet for initially connecting to the terminal 102.

The printer 202 performs print operations including reception of print image data, transmission and reception of control signals associated with the print operations, charging to photosensitive drums, exposure of image data, development of an image using toner, transfer of the image to a recording medium, and fixing of the image. The scanner 203 performs reading of an original, generation and transmission of read image data, transmission and reception of a control signal associated with the reading operation, and transmission of a sleep restoration signal responsive to detection of an original. The console section 204 performs transmission and reception of input signals indicative of e.g. selection of a variety of function keys, execution/stop of a job, and on/off of the power supply key, and reception and display of display image data. The FAX 205 performs modulation/demodulation and transmission of image data, transmission and reception of signals to and from a telephone line, and processing for detecting a call signal from the telephone line and connecting to a telephone or a modulation/demodulation section. The power supply 206 performs conversion of input power from AC to DC and control of an output voltage according to a received control signal. The WLAN 207 will be described hereinafter with reference to FIG. 3. The NFC 208 holds and updates the connection information of the image forming apparatus 101, and performs communication with a mobile terminal based on the NFC standard. The BLE 209 performs transmission of an advertising packet and communication with the terminal 102 based on the BLE standard.

Figure 3:
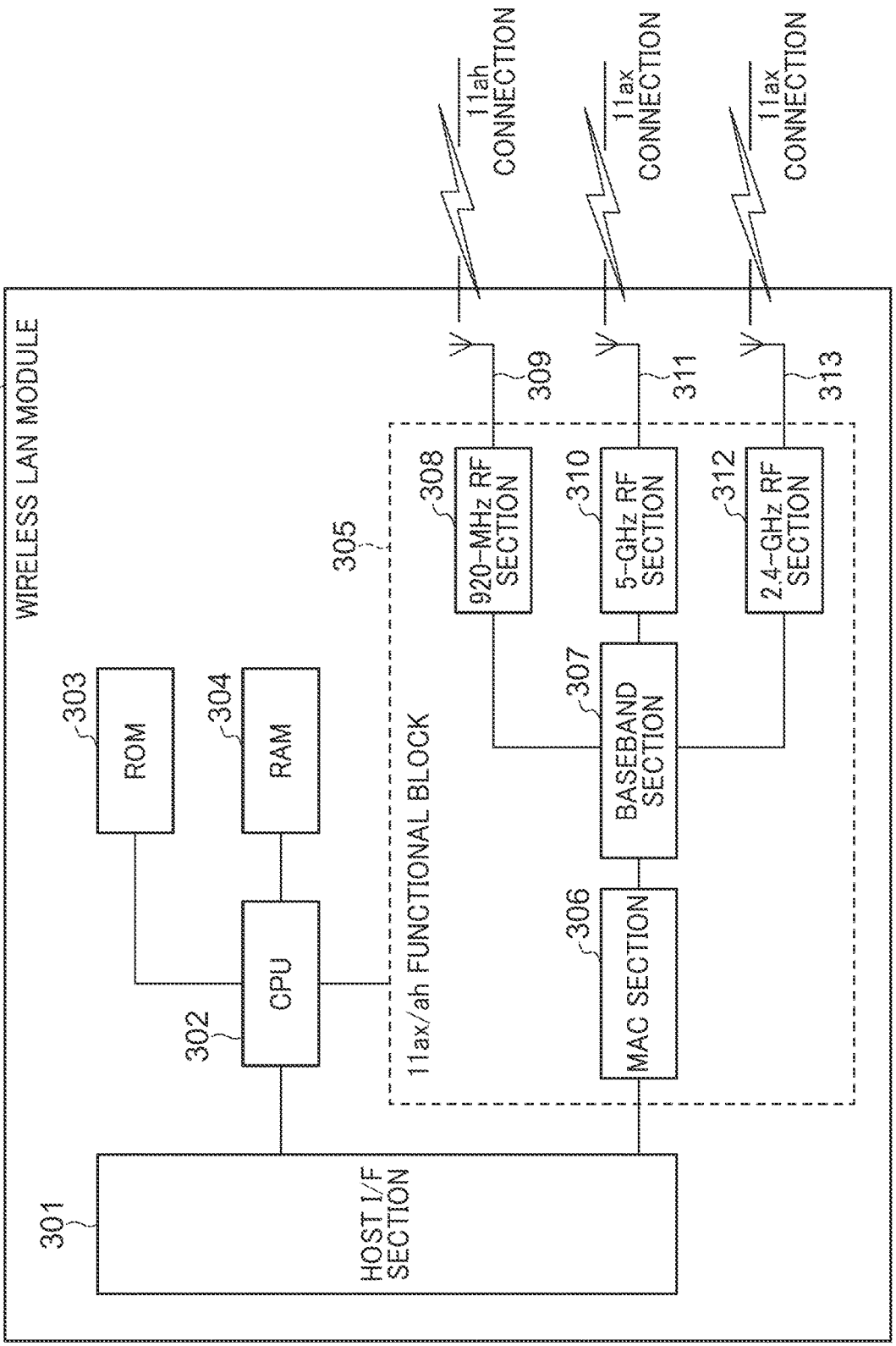
FIG. 3 is a block diagram showing a hardware configuration of a wireless LAN module of the image forming apparatus.

FIG. 3 is a block diagram showing a hardware configuration of a wireless LAN module of the image forming apparatus. The WLAN 207 has the wireless LAN module, denoted by reference numeral 300, shown in FIG. 3. In the illustrated example in FIG. 3, the wireless LAN module 300 is configured to be compliant with the 11ax and 11ah standards. Note that the wireless LAN module 300 is not limited to the configuration shown in FIG. 3 but may be configured to be further compliant with the IEEE 802.11a, IEEE 802.11b, and IEEE 802.11g standards. Further, the wireless LAN module 300 may be configured to be also compliant with the IEEE 802.11n and IEEE 802.11ac standards, and the like. The wireless LAN module 300 includes a host interface section 301, a CPU 302, a ROM 303, a RAM 304, a 11ax/ah functional block 305, an antenna 309, an antenna 311, and an antenna 313. The 11ax/ah functional block 305 includes a MAC section 306, a baseband section 307, a 920-MHz RF section 308, a 5-GHz RF section 310, and a 2.4-GHz RF section 312.

The host interface section 301 is an interface with a host system to which the wireless LAN module 300 is connected. The host interface section 301 is formed by protocols, such as USB, SDIO, and UART. In the present embodiment, the host interface section 301 is connected to the CPU 211 via the WLAN interface 225 of the controller 201. The CPU 302 is a central processing unit for controlling the overall operation of the wireless LAN module 300. The CPU 302 communicates with the host system via the host interface section 301 and controls the components (blocks) of the wireless LAN module 300 according to a request received from the host system. The ROM 303 is a nonvolatile memory storing program data for the CPU 302. The RAM 304 is a work memory for the operation of the CPU 302 and stores control programs for the CPU 302.

The 11ax/ah functional block 305 is configured to be compliant with the 11ax and 11ah standards. The 11ax/ah functional block 305 includes the MAC section 306, the baseband section 307, the 920-MHz RF section 308, the 5-GHz RF section 310, and the 2.4-GHz RF section 312, and these components are controlled by the CPU 302. The MAC section 306 is a media access control (MAC) layer formed based on the specifications regulated by the 11ax and 11ah standards. The MAC section 306 performs IP packet processing, including providing and deleting a MAC address of a data link layer. Further, in the MAC layer, as a protocol for avoiding access collision on the network 100, CSMA/CA is specified. Note that in the 11ah standard, to save power, restricted access window (RAW) and target wake time (TWT) functions are added to the MAC layer. The CPU 302 can switch the function of the MAC section 306 to 11ax or 11ah according to a request from the host system. The baseband section 307 is formed based on the specifications regulated by the flax and 11ah standards. The baseband section 307 has a function of modulating or demodulating between an IP packet signal subjected to MAC processing and a baseband signal. In the baseband section 307, as the data modulation method, orthogonal frequency division multiplexing (OFDM) is specified. Further, the baseband section 307 is designed such that a clock frequency in the 11ah standard is 1/10 of that in the 11ax standard. With this, in the 11ah connection, more power is saved than in the 11ax connection. The CPU 302 can switch the function of the baseband section 307 to 11ax or 11ah according to a request from the host system. The 920-MHz RF section 308 restores a wireless signal received by the antenna 309 to a baseband signal by eliminating a wireless carrier frequency from the wireless signal and delivers the restored baseband signal to the baseband section 307. The 920-MHz RF section 308 modulates a baseband signal received from the baseband section 307 onto a wireless carrier frequency to form a wireless signal and delivers the wireless signal from the antenna 309. The 920-MHz RF section 308 is configured to be capable of generation/elimination of a carrier wave in a 920 MHz band used by 11ah. The CPU 302 can switch on or off the function of the 920-MHz RF section 308 according to a request from the host system. The 5-GHz RF section 310 restores a wireless signal received by the antenna 311 to a baseband signal by eliminating a wireless carrier frequency from the wireless signal and delivers the restored baseband signal to the baseband section 307. The RF section 310 modulates a baseband signal received from the baseband section 307 onto a wireless carrier frequency to form a wireless signal and delivers the wireless signal from the antenna 311. The 5-GHz RF section 310 is configured to be capable of generation/elimination of a carrier wave in a 5 GHz band used by flax. The CPU 302 can switch on or off the function of the 5-GHz RF section 310 according to a request from the host system. The 2.4-GHz RF section 312 restores a wireless signal received by the antenna 313 to a baseband signal by eliminating a wireless carrier frequency from the wireless signal and delivers the restored baseband signal to the baseband section 307. The 2.4-GHz RF section 312 modulates a baseband signal received from the baseband section 307 onto a wireless carrier frequency to form a wireless signal and delivers the wireless signal from the antenna 313. The 2.4-GHz RF section 312 is configured to be capable of generation/elimination of a carrier wave in a 2.4 GHz band used by 11ax. The CPU 302 can switch on or off the function of the 2.4-GHz RF section 312 according to a request from the host system. Thus, in the 11ax/ah functional block 305, the MAC section 306, the baseband section 307, the 920-MHz RF section 308, and the antenna 309 are configured to form a first communication unit that performs wireless communication with the first access point 105*a*. Further, the MAC section 306, the baseband section 307, the 5-GHz RF section 310, and the antenna 311 are configured to form a second communication unit that performs wireless communication with the second access point 105*b*. Similarly, the MAC section 306, the baseband section 307, the 2.4-GHz RF section 312, and the antenna 313 are also configured to form the second communication unit. Note that in a case where the 11ax/ah functional block 305 is configured to be further adaptable to the above-mentioned other IEEE 802.11 standard, such as IEEE 802.11a, the MAC section 306 and the baseband section 307 may be designed and controlled such that the MAC section 306 and the baseband section 307 are adaptable to the other standard.

The image forming apparatus 101 is configured to be capable of selecting the two wireless communication modes, and in the present embodiment, the image forming apparatus 101 is used in a use environment in which these two wireless communication modes can be simultaneously started. A first one of the two wireless communication modes is a direct wireless communication mode (power saving mode) based on the wireless communication standard 104 which is low in speed but enables wide range communication, i.e. a first wireless communication mode by the first wireless communication method. A second one of them is a direct wireless communication mode (normal mode) based on the high-speed wireless communication standard 103, i.e. a second wireless communication mode by the second wireless communication method. Note that the first wireless communication mode is capable of making power consumption smaller than the second wireless communication mode. The image forming apparatus 101 performs control, according to a priority setting of the direct wireless connection and a mode (option of direct connection) selected by a user, such that the terminal 102 displays only connection information of one of the modes.

Table 1 shown in FIG. 11 shows examples of a combination of a screen displayed on the console section 204 of the image forming apparatus 101, a wireless communication mode set as a priority setting in advance, and a communication standard for which broadcasting is performed, when direct connection is selected by a user. Note that "a communication standard for which broadcasting is performed" refers to a communication standard for which an SSID of an access point is broadcast so as to cause the same to be displayed. Further, here, No. 1 and No. 3 in Table 1 will be described as representatives. In No. 1, the normal mode is set as the priority setting, and the user refers to a screen 404 shown in FIG. 4D. In No. 3, the normal mode is set as the priority setting, and the user refers to a screen 405 shown in FIG. 4E.

Figure 4A:
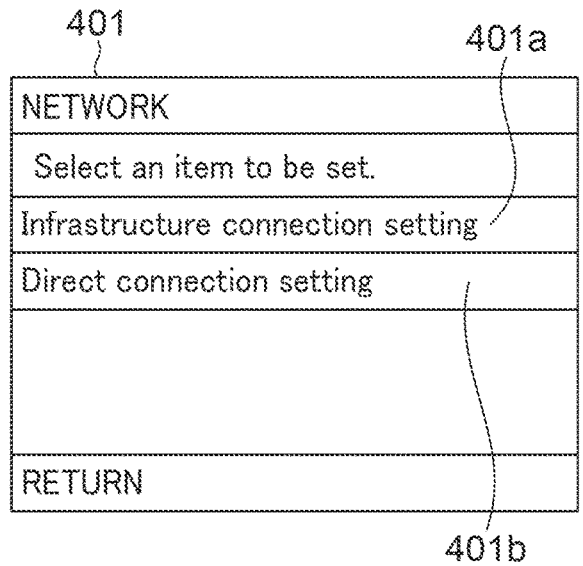
FIGS. 4A to 4E are diagrams each showing an example of a screen (operation screen) displayed on a console section of the image forming apparatus.
Figure 4B:
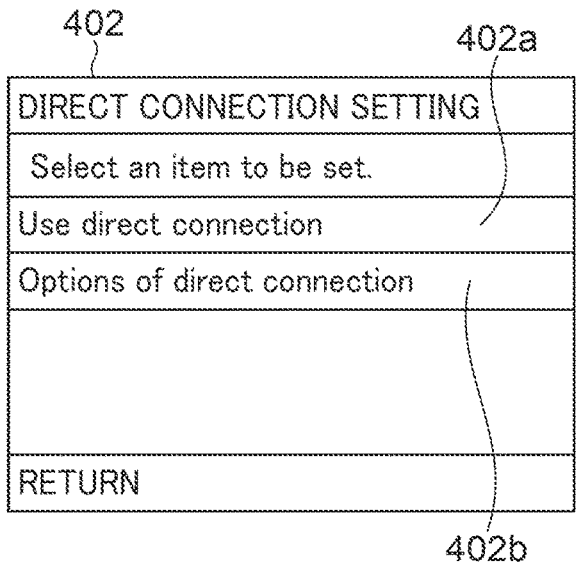
Figure 4C:
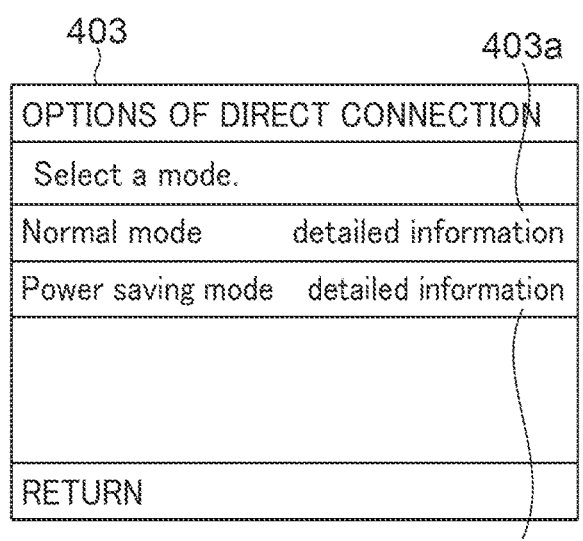
Figure 4D:
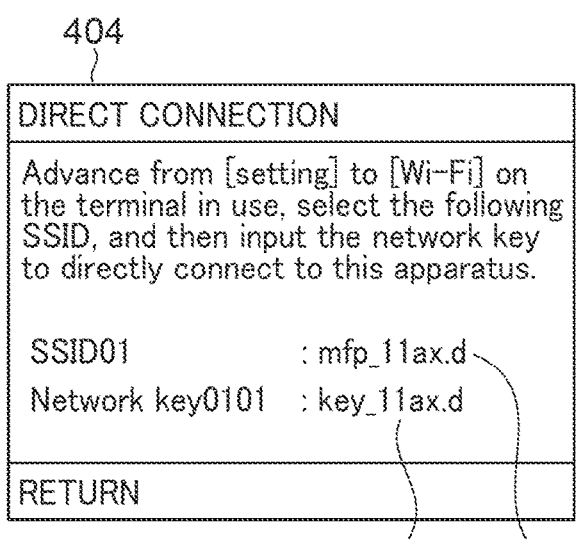
Figure 4E:
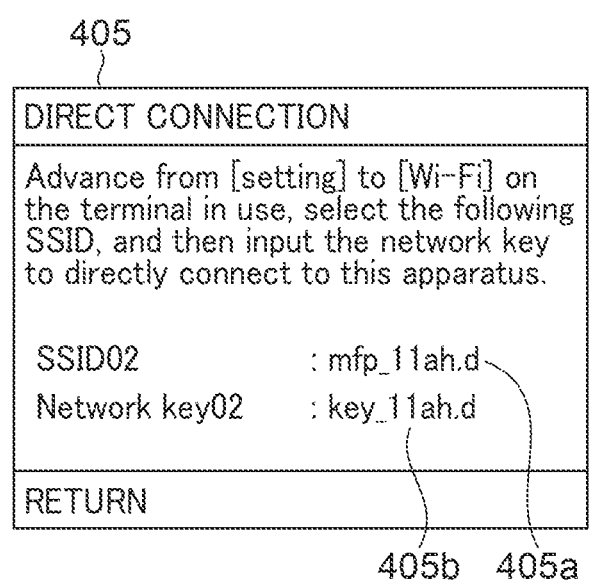

FIGS. 4A to 4E are diagrams each showing an example of a screen (operation screen) displayed on the console section 204 of the image forming apparatus 101. In a case where "network" is selected on a setting screen, not shown, displayed on the console section 204 of the image forming apparatus 101, a screen 401 shown in FIG. 4A is displayed on the console section 204. The screen 401 includes a selection item 401*a* of "infrastructure connection setting" and a selection item 401*b* of "direct connection setting". In a case where the selection item 401*b* of "direct connection setting" is selected, a screen 402 shown in FIG. 4B is displayed on the console section 204. The screen 402 includes a selection item 402*a* of "use direct connection" (default) and a selection item 402*b* of "options of direct connection". In a case where the selection item 402*a* (use direction connection) is selected, the screen 404 shown in FIG. 4D is displayed on the console section 204. The screen 404 includes a message describing a procedure of operations to be performed on the terminal 102, and connection information (an SSID 404*a* indicating "SSID 01" and a network key 404*b* indicating "network key 01") of the high-speed wireless communication standard 103 (normal mode) set as the priority setting. On the other hand, in a case where the selection item 402*b* (options of direction connection) is selected on the screen 402, a screen 403 shown in FIG. 4C is displayed on the console section 204. The screen 403 is a mode selection screen, on which the user can select one of the wireless communication modes. In a case where detailed information 403a of the "normal mode" is selected on the screen 403, the above-mentioned screen 404 is displayed on the console section 204. On the other hand, in a case where detailed information 403b of the "power saving mode" is selected on the screen 403, the screen 405 shown in FIG. 4E is displayed on the console section 204. The screen 405 includes a message describing a procedure of operations to be performed on the terminal 102 and connection information (an SSID 405a indicating "SSID 02" and a network key 405b indicating "network key 02") of the low-speed wireless communication standard 104 (power saving mode). Thus, in the present embodiment, the detailed information 403a of the screen 403 functions as an operation unit for selecting whether or not to enable use of the normal mode, and the detailed information 403b functions as an operation unit for selecting whether or not to enable use of the power saving mode. This makes it possible to easily perform a switching operation for switching between enabling and disabling of each wireless communication mode.

Figure 5A:
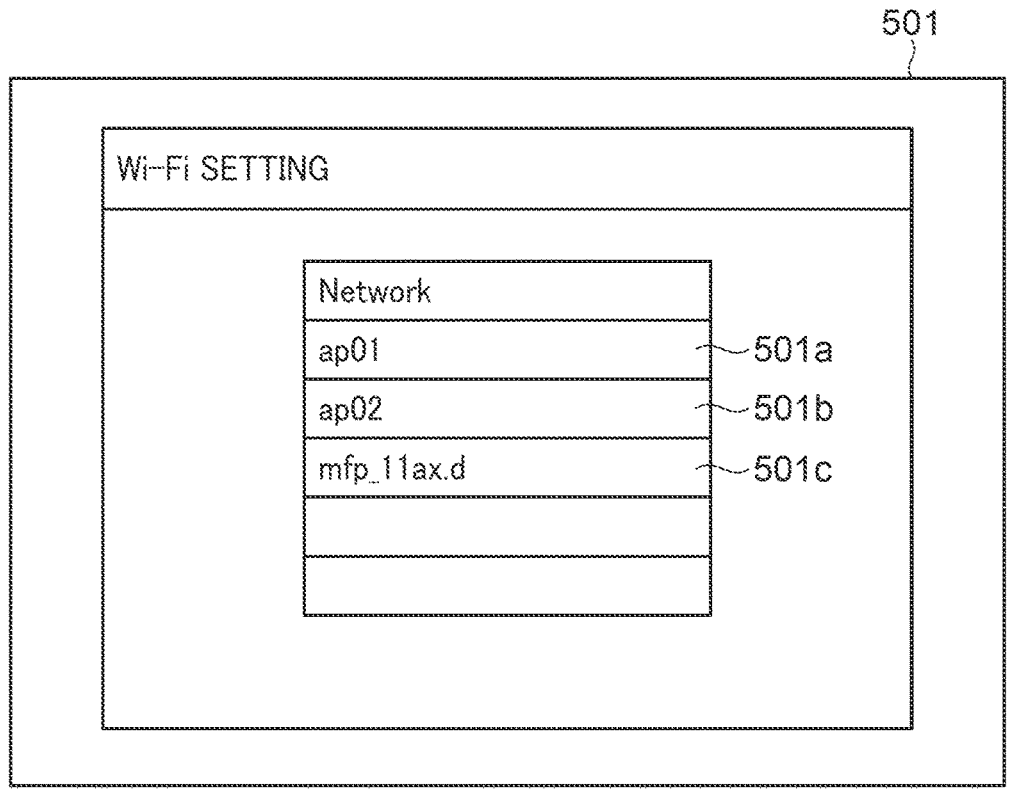
FIGS. 5A and 5B are diagrams each showing an example of a screen displayed on a mobile terminal.
Figure 5B:
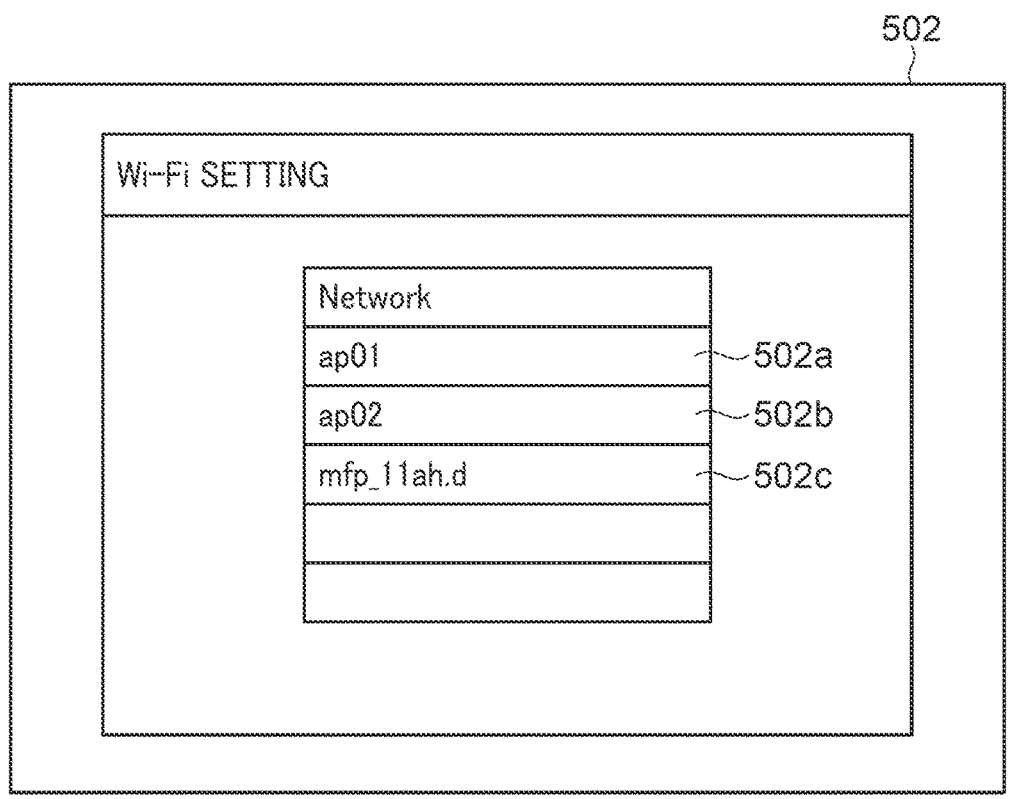

FIGS. 5A and 5B are diagrams each showing an example of a screen displayed on the mobile terminal. In a case where the screen 404 is displayed on the console section 204 of the image forming apparatus 101, a screen 501 shown in FIG. 5A is displayed on the terminal 102. The screen 501 includes a plurality of SSIDs (e.g. an SSID 501a, an SSID 501b, and an SSID 501c) associated with the use environment of the terminal 102. At this time, the user can select one of the plurality of SSIDs, which matches the SSID in the screen 404 (SSID 501c), on the terminal 102, and input the network key in the screen 404, on the terminal 102. With this, the image forming apparatus 101 can start direct connection to the terminal 102 in the normal mode. On the other hand, in a case where the screen 405 is displayed on the console section 204 of the image forming apparatus 101, a screen 502 shown in FIG. 5B is displayed on the terminal 102. The screen 502 includes a plurality of SSIDs (e.g. an SSID 502a, an SSID 502b, and an SSID 502c) associated with the use environment of the terminal 102. At this time, the user can select one of the plurality of SSIDs, which matches the SSID displayed on the screen 405 (SSID 502c), on the terminal 102, and input the network key in the screen 405, on the terminal 102. With this, the image forming apparatus 101 can start direct connection to the terminal 102 in the power saving mode.

Thus, in a case where wireless communication connection of the image forming apparatus 101 is performed, an SSID is used for the connection processing. However, as shown in FIG. 5A, if the SSID 501a, the SSID 501b, and the SSID 501c are broadcast, the user cannot determine which of the SSIDs is to be used, and this may cause an erroneous operation. Similarly, as shown in FIG. 5B, if the SSID 502a, the SSID 502b, and the SSID 502c are broadcast, the user cannot determine which of the SSIDs is to be used, and this may cause an erroneous operation.

To prevent this, the image forming apparatus 101 is configured to be capable of reducing an erroneous operation when wireless communication connection is performed. This configuration and the effect will be described below.

Figure 6A:
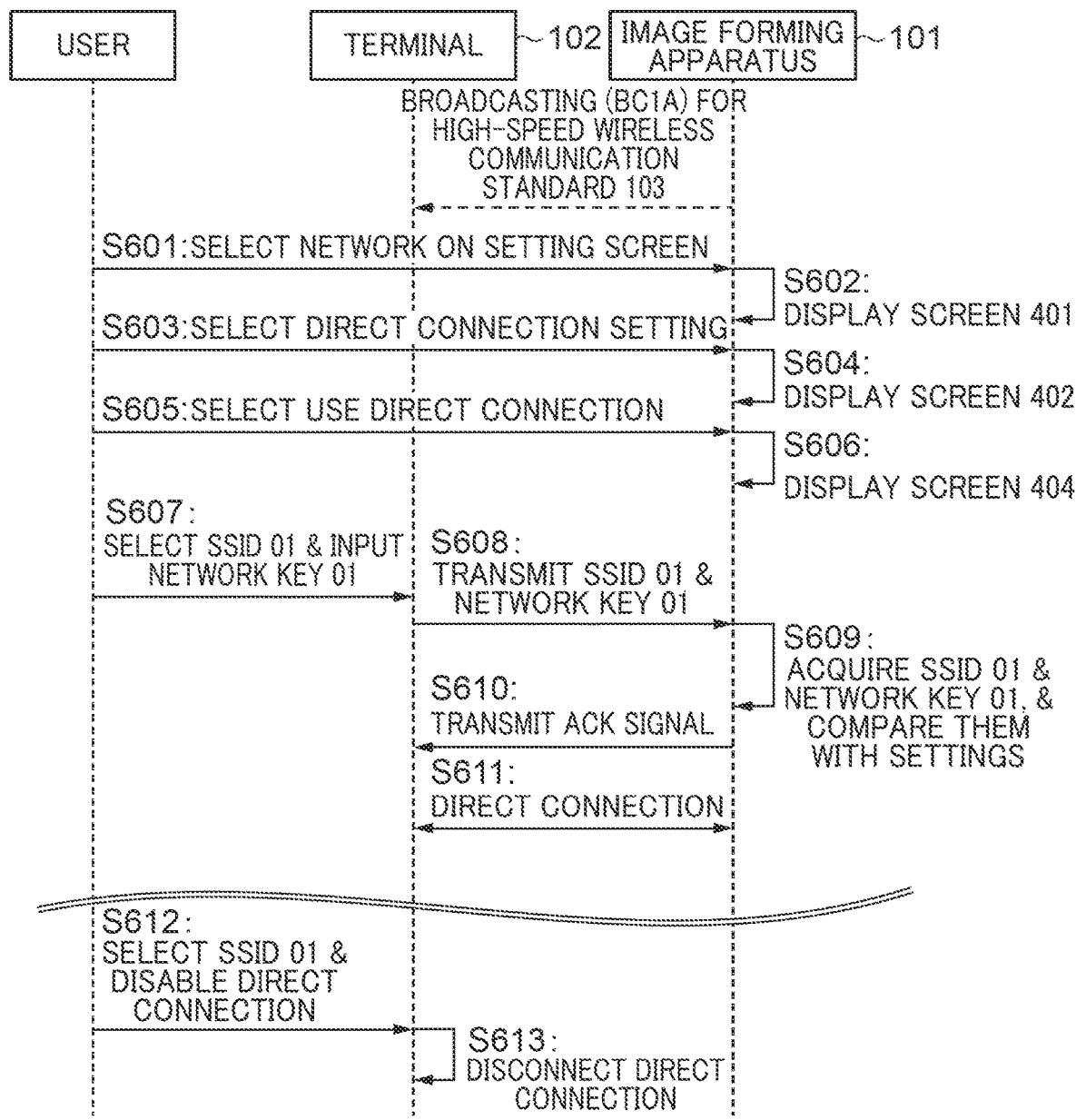
FIG. 6A is a sequence diagram of operations of a connection and disconnection process in a normal mode.

FIG. 6A is a sequence diagram of operations of a connection and disconnection process in the normal mode. This sequence includes an operation for direct connection in a case where the selection item 402a (use direct connection) is selected on the screen 402, which case corresponds to No. 1 on Table 1, and an operation for disconnecting the direct connection.

First, the operation for direct connection will be described. As shown in FIG. 6A, in a step S601, the user selects "network" on the setting screen displayed on the console section 204 of the image forming apparatus 101. In a step S602, the image forming apparatus 101 displays the screen 401. In a step S603, the user selects the selection item 401b (direct connection setting) on the screen 401. In a step S604, the image forming apparatus 101 displays the screen 402. In a step S605, the user selects the selection item 402a (use direct connection) on the screen 402. In a step S606, the image forming apparatus 101 displays the screen 404. At this time, the terminal 102 is in a state in which broadcasting thereto is controlled by the controller 201 of the image forming apparatus 101. This control is for performing broadcasting only for the high-speed wireless communication standard 103, i.e. broadcasting the SSID 01 (SSID 501c), and inhibiting broadcasting of the other SSIDs (see a broken-line arrow BC1A in FIG. 6A). With this, in a step S607, the user can quickly select the SSID 01 (SSID 501c) on the terminal 102 and also input the network key 01. In a step S608, the terminal 102 transmits the SSID 01 and the network key 01, which have been selected and input, respectively, in the step S607, to the image forming apparatus 101. In a step S609, the image forming apparatus 101 acquires the SSID 01 and the network key 01, which have been transmitted in the step S608, and compares the SSID 01 and the network key 01 with the settings thereof. In a step S610, the image forming apparatus 101 transmits an ACK signal to the terminal 102. The "ACK signal" refers to a signal which is transmitted from a reception side to a transmission side in data communication and indicates that data has been normally received. In a step S611, direct connection between the image forming apparatus 101 and the terminal 102 is completed.

Next, the operation for disconnecting the direct connection will be described. As shown in FIG. 6A, in a step S612, the user selects the SSID 01 on the terminal 102 and disables the direct connection. In a step S613, the terminal 102 disconnects the direct connection.

Figure 6B:
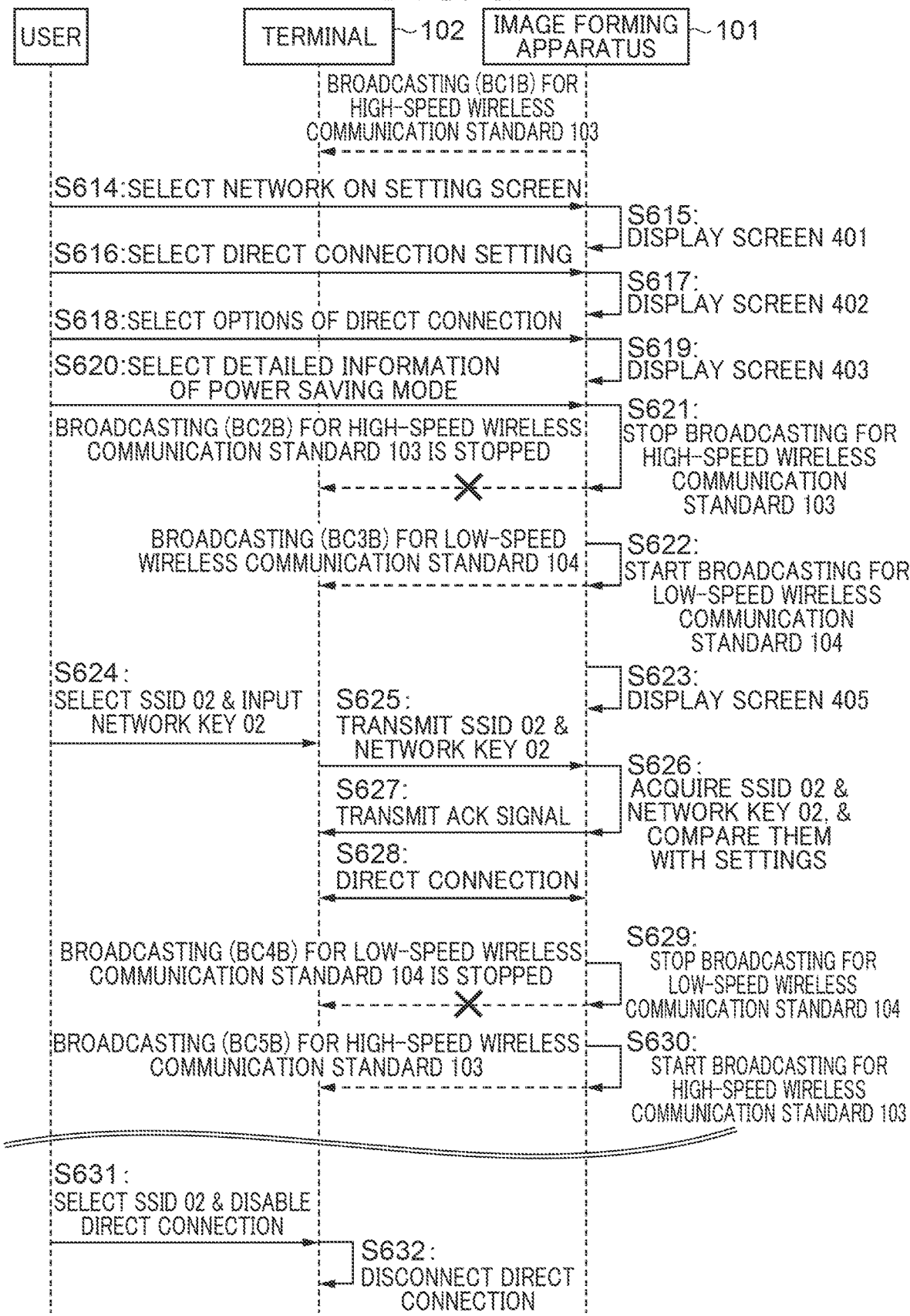
FIG. 6B is a sequence diagram of operations of a connection and disconnection process in a power saving mode.

FIG. 6B is a sequence diagram of operations of a connection and disconnection process in the power saving mode. This sequence includes an operation for direct connection in a case where the selection item 402b (options of direct connection) is selected on the screen 402 and then the "power saving mode" is selected on the screen 403, which case corresponds to No. 3 on Table 1, and an operation for disconnecting the direct connection.

First, the operation for direct connection will be described. As shown in FIG. 6B, in a step S614, the user selects "network" on the setting screen displayed on the console section 204 of the image forming apparatus 101. In a step S615, the image forming apparatus 101 displays the screen 401. In a step S616, the user selects the selection item 401b (direct connection setting) on the screen 401. In a step S617, the image forming apparatus 101 displays the screen 402. In a step S618, the user selects the selection item 402b (options of direct connection) on the screen 402. In a step S619, the image forming apparatus 101 displays the screen 403. In a step S620, the user selects the detailed information 403b of the "power saving mode" on the screen 403. In a step S621, the image forming apparatus 101 stops broadcasting for the high-speed wireless communication standard 103. With this, the communication between the image forming apparatus 101 and the terminal 102 is changed from a state in which broadcasting is performed for the wireless communication standard 103 (see a first broken-line arrow BC1B in FIG. 6B) to a state in which broadcasting is stopped (see a second broken-line arrow BC2B in FIG. 6B). In a step S622, the image forming apparatus 101 starts broadcasting for the low-speed wireless communication standard 104. This changes the communication between the image forming apparatus 101 and the terminal 102 to a state in which broadcasting for the low-speed wireless communication standard 104 is performed (see a third broken-line arrow BC3B in FIG. 6B). In a step S623, the image forming apparatus 101 displays the screen 405. At this time, the terminal 102 is in a state in which only an SSID for the low-speed wireless communication standard 104 is broadcast thereto, but the other SSIDs are inhibited from being broadcast thereto. With this, in a step S624, the user can quickly select the SSID 02 (SSID 502c) on the terminal 102 and also input the network key 02. In a step S625, the terminal 102 transmits the SSID 02 and the network key 02, which have been selected and input, respectively, in the step S624, to the image forming apparatus 101. In a step S626, the image forming apparatus 101 acquires the SSID 02 and the network key 02, which have been transmitted in the step S625, and compares the SSID 02 and the network key 02 with the settings thereof. In a step S627, the image forming apparatus 101 transmits an ACK signal to the terminal 102. In a step S628, the direct connection between the image forming apparatus 101 and the terminal 102 is completed. In a step S629, the image forming apparatus 101 stops broadcasting for the low-speed wireless communication standard 104. With this, the communication between the image forming apparatus 101 and the terminal 102 is changed from the state in which broadcasting for the low-speed wireless communication standard 104 is performed (see the third broken-line arrow BC3B in FIG. 6B) to a state in which broadcasting for the low-speed wireless communication standard 104 ceases to be performed (see a fourth broken-line arrow BC4B in FIG. 6B). In a step S630, the image forming apparatus 101 starts broadcasting for the high-speed wireless communication standard 103 again. This changes the communication between the image forming apparatus 101 and the terminal 102 to a state in which broadcasting for the high-speed wireless communication standard 103 is performed (see a fifth broken-line arrow BC5B in FIG. 6B).

Next, the operation for disconnecting the direct connection will be described. As shown in FIG. 6B, in a step S631, the user selects the SSID 02 on the terminal 102 and disables the direct connection. In a step S632, the terminal 102 disconnects the direct connection.

Figure 7A:
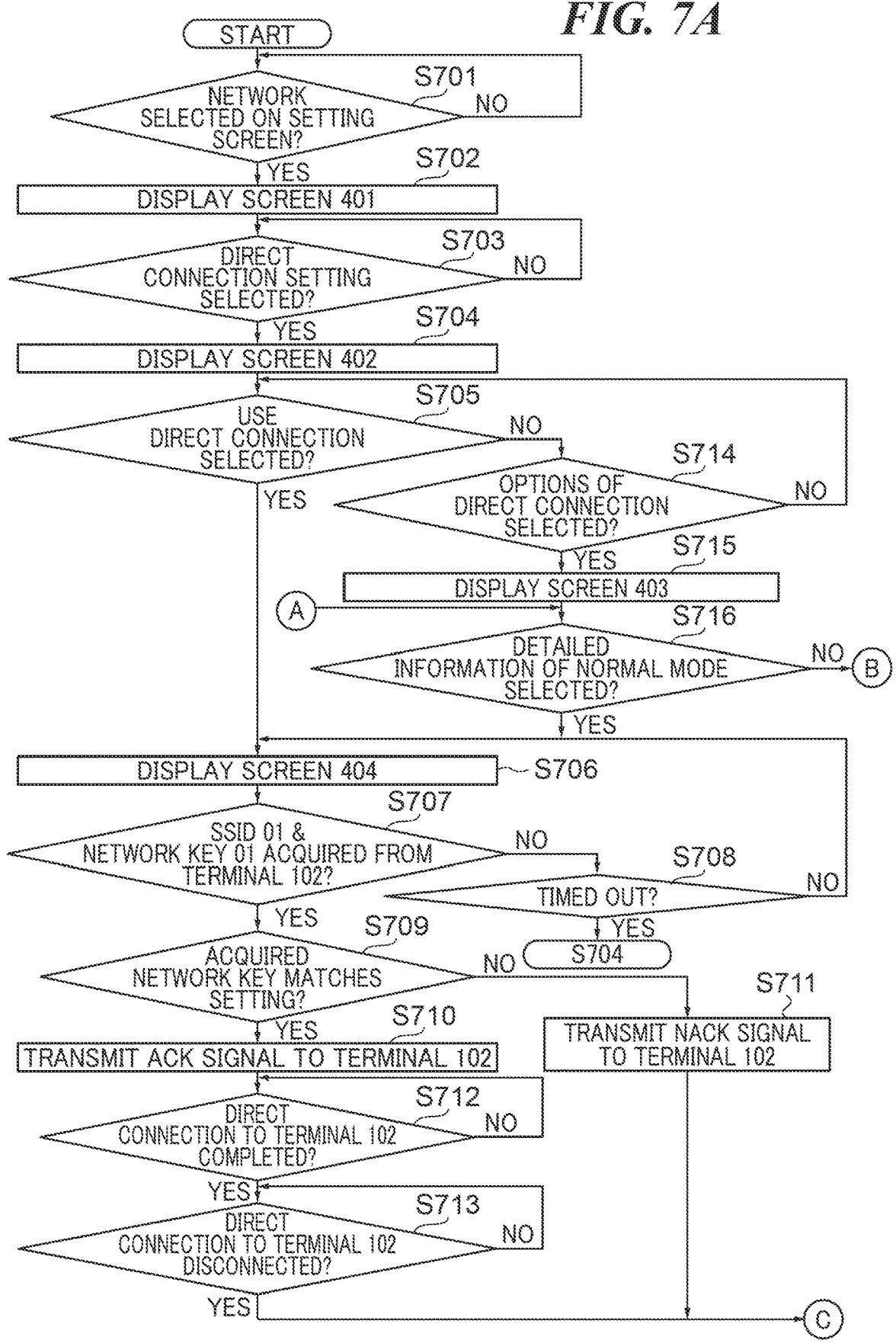
FIG. 7A is a flowchart of the connection and disconnection process performed when the image forming apparatus is connected by direct connection and the direct connection is disconnected.
Figure 7B:
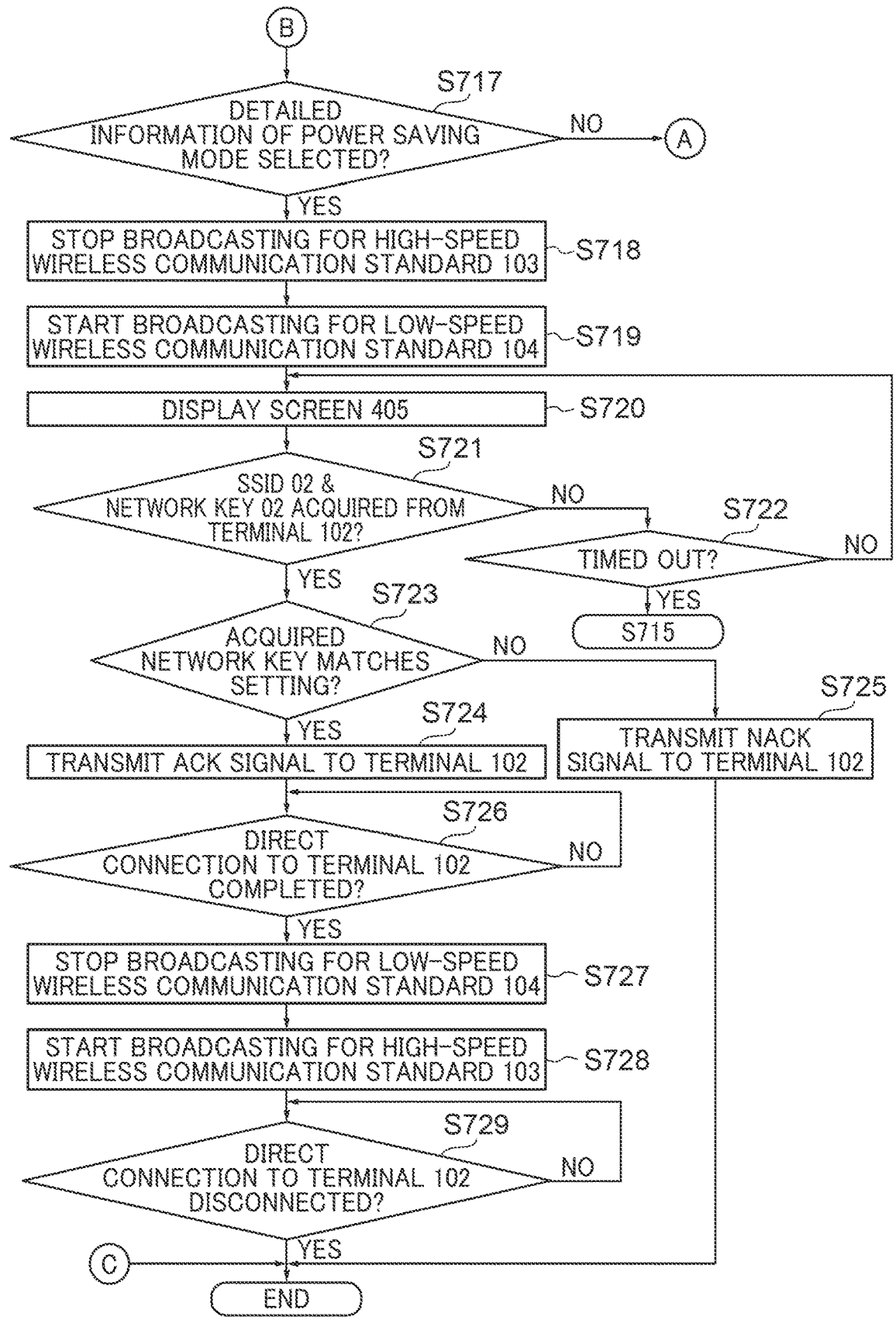
FIG. 7B is a continuation of FIG. 7A.

FIGS. 7A and 7B are a flowchart of the connection and disconnection process performed when the image forming apparatus is connected by direct connection and the direct connection is disconnected. First, direct connection by selecting the selection item 402a (use direct connection) on the screen 402 and disconnection of the direction connection will be described. As shown in FIG. 7A, in a step S701, the controller 201 (CPU 211) of the image forming apparatus 101 determines whether or not "network" has been selected on the setting screen displayed on the console section 204 of the image forming apparatus 101. If it is determined in the step S701 that "network" has been selected, the process proceeds to a step S702. On the other hand, if it is determined in the step S701 that "network" has not been selected, the process continues the step S701.

In the step S702, the controller 201 displays the screen 401 on the console section 204.

In a step S703, the controller 201 determines whether or not the selection item 401b (direct connection setting) on the screen 401 has been selected. If it is determined in the step S703 that the selection item 401b has been selected, the process proceeds to a step S704. On the other hand, if it is determined in the step S703 that the selection item 401b has not been selected, the process continues the step S703.

In the step S704, the controller 201 displays the screen 402 on the console section 204.

In a step S705, the controller 201 determines whether or not the selection item 402a (use direct connection) on the screen 402 has been selected. If it is determined in the step S705 that the selection item 402a has been selected, the process proceeds to a step S706. On the other hand, if it is determined in the step S705 that the selection item 402a has not been selected, the process proceeds to a step S714.

In the step S706, the controller 201 displays the screen 404 on the console section 204.

In a step S707, the controller 201 determines whether or not the SSID 01 and the network key 01 have been acquired from the terminal 102. If it is determined in the step S707 that the SSID 01 and the network key 01 have been acquired, the process proceeds to a step S709. On the other hand, if it is determined in the step S707 that the SSID 01 and the network key 01 have not been acquired, the process proceeds to a step S708.

In the step S708, the controller 201 determines whether or not the operation has timed out after the screen 404 is displayed in the step S706. If it is determined in the step S708 that the operation has timed out, the process returns to the step S704, and the step S704 et seq. are sequentially executed. On the other hand, if it is determined in the step S708 that the operation has not timed out, the process returns to the step S706.

In the step S709 after execution of the step S707, the controller 201 determines whether or not the network key 01 acquired in the step S707 and the setting thereof match. If it is determined in the step S709 that there is a match, the process proceeds to a step S710 and then to a step S712. On the other hand, if it is determined in the step S709 that there is no match, the process proceeds to a step S711.

In the step S710, the controller 201 transmits an ACK signal to the terminal 102.

In the step S711, the controller 201 transmits a NACK signal to the terminal 102, followed by terminating the present process. Note that the "NACK signal" refers to a signal which is transmitted from a reception side to a transmission side in data communication and indicates that data has not been normally received.

In the step S712 after execution of the step S710, the controller 201 determines whether or not the direct connection to the terminal 102 is completed. If it is determined in the step S712 that the direct connection is completed, the process proceeds to a step S713. On the other hand, if it is determined in the step S712 that the direct connection is not completed, the process continues the step S712.

In the step S713, the controller 201 determines whether or not the direct connection to the terminal 102 has been disconnected. If it is determined in the step S713 that the direct connection has been disconnected, the present process is terminated. On the other hand, if it is determined in the step S713 that the direct connection has not been disconnected, the process continues the step S713.

Next, direct connection by selecting the selection item 402b (options of direct connection) on the screen 402 and selecting the detailed information 403b of the "power saving mode" on the screen 403, and disconnection of the direct connection will be described. As shown in FIG. 7A, in the step S714 after execution of the step S705, the controller 201 determines whether or not the selection item 402b (options of direct connection) on the screen 402 has been selected. If it is determined in the step S714 that the selection item 402b has been selected, the process proceeds to a step S715. On the other hand, if it is determined in the step S714 that the selection item 402b has not been selected, the process returns to the step S705.

In the step S715, the controller 201 displays the screen 403 on the console section 204.

In a step S716, the controller 201 determines whether or not the detailed information 403a of the "normal mode" on the screen 403 has been selected. If it is determined in the step S716 that the detailed information 403a has been selected, the process proceeds to the step S706, and the step S706 et seq. are sequentially executed. On the other hand, if it is determined in the step S716 that the detailed information 403a has not been selected, the process proceeds to a step S717 in FIG. 7B.

In the step S717, the controller 201 determines whether or not the detailed information 403b of the "power saving mode" on the screen 403 has been selected. If it is determined in the step S717 that the detailed information 403b has been selected, the process proceeds to a step S718. On the other hand, if it is determined in the step S717 that the detailed information 403b has not been selected, the process returns to the step S716 in FIG. 7A.

In the step S718, the controller 201 stops broadcasting for the high-speed wireless communication standard 103.

In a step S719, the controller 201 starts broadcasting for the low-speed wireless communication standard 104.

In a step S720, the controller 201 displays the screen 405 on the console section 204.

In a step S721, the controller 201 determines whether or not the SSID 02 and the network key 02 have been acquired from the terminal 102. If it is determined in the step S721 that the SSID 02 and the network key 02 have been acquired, the process proceeds to a step S723. On the other hand, if it is determined in the step S721 that the SSID 02 and the network key 02 have not been acquired, the process proceeds to a step S722.

In the step S722, the controller 201 determines whether or not the operation has timed out after the screen 405 is displayed in the step S720. If it is determined in the step S722 that the operation has timed out, the process returns to the step S715, and the step S715 et seq. are sequentially executed. On the other hand, if it is determined in the step S722 that the operation has not timed out, the process returns to the step S720.

In the step S723 after execution of the step S721, the controller 201 determines whether or not the network key 02 acquired in the step S721 and the setting thereof match. If it is determined in the step S723 that there is a match, the process proceeds to a step S724. On the other hand, if it is determined in the step S723 that there is no match, the process proceeds to a step S725.

In the step S724, the controller 201 transmits an ACK signal to the terminal 102.

In the step S725, the controller 201 transmits a NACK signal to the terminal 102, followed by terminating the present process.

In a step S726 after execution of the step S724, the controller 201 determines whether or not the direct connection to the terminal 102 is completed. If it is determined in the step S726 that the direct connection is completed, the process proceeds to a step S727. On the other hand, if it is determined in the step S726 that the direct connection is not completed, the process continues the step S726.

In the step S727, the controller 201 stops broadcasting for the low-speed wireless communication standard 104.

In a step S728, the controller 201 starts broadcasting for the high-speed wireless communication standard 103.

In a step S729, the controller 201 determines whether or not the direct connection to the terminal 102 has been disconnected. If it is determined in the step S729 that the direct connection has been disconnected, the present process is terminated. On the other hand, if it is determined in the step S729 that the direct connection has not been disconnected, the process continues the step S729.

As described above, in a state in which the first access point 105a and the second access point 105b have been started and wireless communication with each access point is being performed, broadcast control can be performed by the controller 201. The broadcast control is control for broadcasting the SSID of one of the first access point 105a and the second access point 105b and inhibiting broadcasting of the SSID of the other of the first access point 105a and the second access point 105b. Further, the broadcast control is performed based on mode selection between the power saving mode (first wireless communication mode) using the low-speed wireless communication standard 104 and the normal mode (second wireless communication mode) using the high-speed wireless communication standard 103. Then, in a case where the power saving mode is selected, broadcasting is controlled to a state in which the SSID for the power saving mode (SSID 02) is broadcast, and the other SSIDs are inhibited from being broadcast. In a case where the normal mode is selected, broadcasting is controlled to a state in which the SSID for the normal mode (SSID 01) is broadcast, and the other SSIDs are inhibited from being broadcast. With this broadcast control, when performing wireless communication connection, the user can quickly determine which of the SSIDs is to be used, and as a result, an erroneous operation is reduced. Note that the configuration may be such that each SSID may be individually switched between on and off by a manual operation.

Further, after broadcasting is controlled to a state in which the SSID 01 is broadcast, and the SSID 02 is inhibited from being broadcast (see the arrow BC1B in FIG. 6B), the broadcast control is changed. This broadcast control is control for changing the broadcasting state to a state in which the SSID 01 is inhibited from being broadcast and the SSID 02 is broadcast (see the arrow BC2B and the arrow BC3B in FIG. 6B). Then, after the broadcasting state is controlled to the state in which the SSID 01 is inhibited from being broadcast and the SSID 02 is broadcast, the broadcast control is further changed. This broadcast control is control for changing the broadcasting state to a state in which the SSID 01 is broadcast and the SSID 02 is inhibited from being broadcast (see the arrow BC4B and the arrow BC5B in FIG. 6B). With this control change, in a case where broadcasting of the SSID 01 is the default, after completion of predetermined communication connection, it is possible to quickly restore the broadcasting state to the default, and therefore, the usability of the communication connection operation is improved.

Next, a second embodiment will be described with reference to FIGS. 8A to 10D. However, the description will be given mainly of different points from the above-described embodiment, and description of the same points is omitted as deemed appropriate. In the present embodiment, connection information of a mode is displayed according to an all-time setting in direct connection and a mode selected by a user. Table 2 shown in FIG. 12 shows examples of a combination of a screen displayed on the console section 204, on/off of respective all-time settings of the communication standards, and a communication standard or communication standards for which broadcasting is performed. Here, No. 2 and No. 6 in Table 2 will be described as representatives. In No. 2, the all-time setting of the high-speed wireless communication standard 103 is set to off, the all-time setting of the low-speed wireless communication standard 104 is set to on, and the screen 404 shown in FIG. 4D is referred to. In No. 6, the all-time setting of the high-speed wireless communication standard 103 is set to off, the all-time setting of the low-speed wireless communication standard 104 is set to on, and the screen 405 shown in FIG. 4E is referred to. In the following description of the present embodiment, it is assumed that settings of NO. 2 have been made.

Further, although in the present embodiment, the condition for shifting from the screen 401 shown in FIG. 4A to the screen 402 shown in FIG. 4B is the same as that of the first embodiment, the screen shift in a case where the selection item 402a (use direct connection) on the screen 402 shown in FIG. 4B is selected is different. In the case where the selection item 402a (use direct connection) on the screen 402 shown in FIG. 4B is selected, the screen 405 shown in FIG. 4E is displayed on the console section 204. Further, in a case where the selection item 402b (options of direct connection) is selected on the screen 402, the screen 403 shown in FIG. 4C is displayed on the console section 204. Similar to the first embodiment, in a case where the detailed information 403a of the "normal mode" is selected on the screen 403, the screen 404 is displayed on the console section 204. On the other hand, similar to the first embodiment, in a case where the detailed information 403b of the "power saving mode" is selected on the screen 403, the screen 405 is displayed on the console section 204.

Figure 8A:
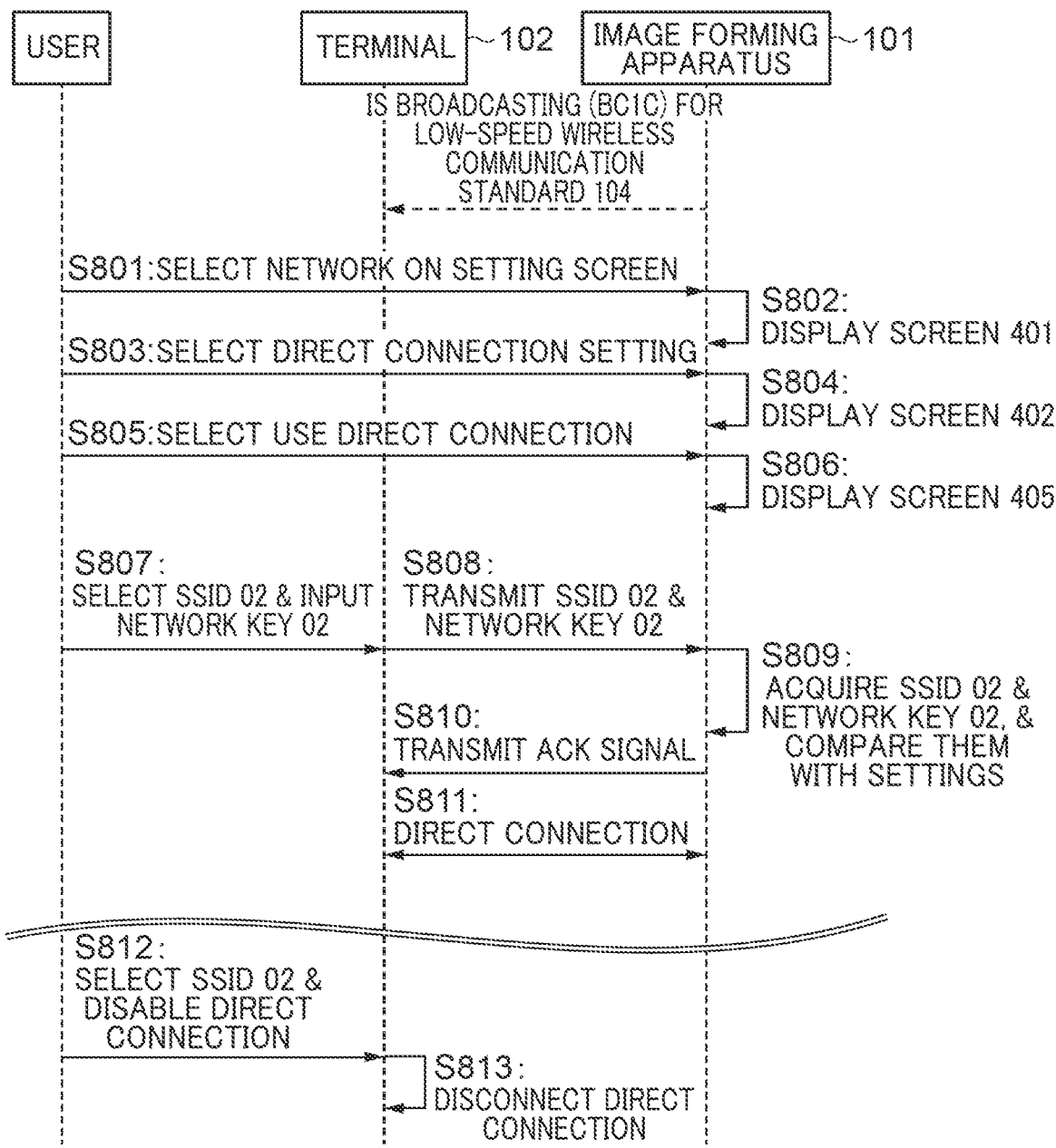
FIG. 8A is a sequence diagram of operations of a connection and disconnection process in the power saving mode in a second embodiment of the present invention.

FIG. 8A is a sequence diagram of operations of a connection and disconnection process in the power saving mode in the second embodiment. This sequence includes an operation for direct connection in a case where "use direct connection" on the screen 402 is selected, and an operation for disconnecting the direct connection.

First, the operation for direct connection will be described. As shown in FIG. 8A, in a step S801, the user selects "network" on the setting screen displayed on the console section 204 of the image forming apparatus 101. In a step S802, the image forming apparatus 101 displays the screen 401. In a step S803, the user selects the selection item 401b (direct connection setting) on the screen 401. In a step S804, the image forming apparatus 101 displays the screen 402. In a step S805, the user selects the selection item 402a (use direct connection) on the screen 402. In a step S806, the image forming apparatus 101 displays the screen 405. At this time, the terminal 102 is in a state in which broadcasting thereto is controlled by the controller 201 of the image forming apparatus 101. This control is for performing broadcasting only for the low-speed wireless communication standard 104, i.e. broadcasting the SSID 02 (SSID 502c), and inhibiting broadcasting of the other SSIDs (see a broken-line arrow BC1C in FIG. 8A). With this, in a step S807, the user can quickly select the SSID 02 (SSID 502c) on the terminal 102 and also input the network key 02. In a step S808, the terminal 102 transmits the SSID 02 and the network key 02, which have been selected and input, respectively, in the step S807, to the image forming apparatus 101. In a step S809, the image forming apparatus 101 acquires the SSID 02 and the network key 02, which have been transmitted in the step S808, and compares the SSID 02 and the network key 02 with the settings thereof. In a step S810, the image forming apparatus 101 transmits an ACK signal to the terminal 102. In a step S811, the direct connection between the image forming apparatus 101 and the terminal 102 is completed.

Next, the operation for disconnecting the direct connection will be described. As shown in FIG. 8A, in a step S812, the user selects the SSID 02 on the terminal 102 and disables the direct connection. In a step S813, the terminal 102 disconnects the direct connection.

Figure 8B:
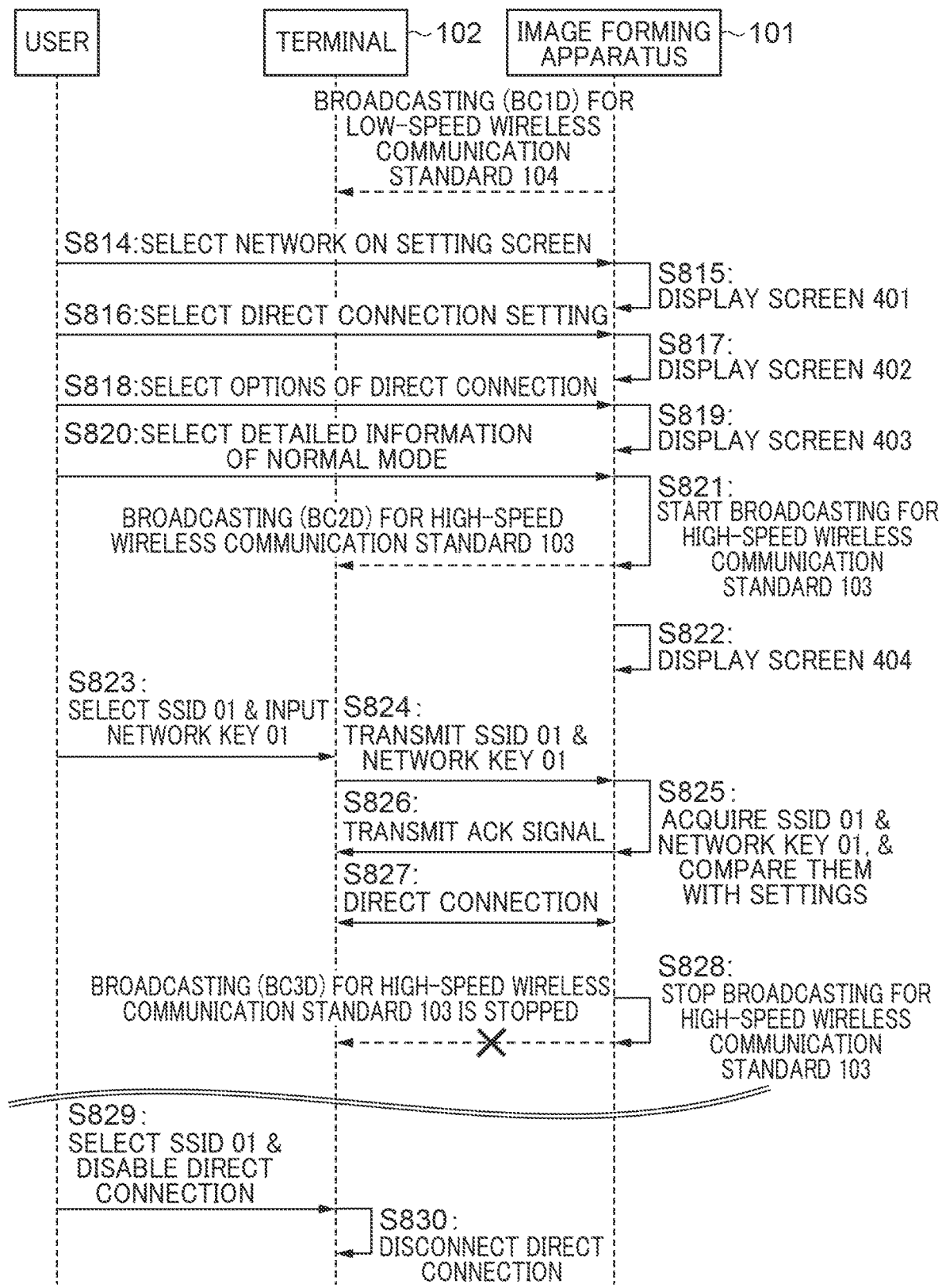
FIG. 8B is a sequence diagram of operations of a connection and disconnection process in the normal mode in the second embodiment.

FIG. 8B is a sequence diagram of operations of a connection and disconnection process in the normal mode in the second embodiment. This sequence includes an operation for direct connection performed in a case where "options of direct connection" on the screen 402 is selected and the "normal mode" is selected, and an operation for disconnecting the direct connection.

First, the operation for direct connection will be described. As shown in FIG. 8B, the image forming apparatus 101 is in a state in which broadcasting for the high-speed wireless communication standard 103 is performed (a first broken-line arrow BC1D in FIG. 8B). In a step S814, the user selects "network" on the setting screen displayed on the console section 204 of the image forming apparatus 101. In a step S815, the image forming apparatus 101 displays the screen 401. In a step S816, the user selects the selection item 401b (direct connection setting) on the screen 401. In a step S817, the image forming apparatus 101 displays the screen 402. In a step S818, the user selects the selection item 402b (options of direct connection) on the screen 402. In a step S819, the image forming apparatus 101 displays the screen 403. In a step S820, the user selects the detailed information 403a of the "normal mode" on the screen 403. In a step S821, the image forming apparatus 101 starts broadcasting for the high-speed wireless communication standard 103 (see a second broken-line arrow BC2D from the top in FIG. 8B). This changes the communication between the image forming apparatus 101 and the terminal 102 to a state in which both broadcasting for the low-speed wireless communication standard 104 and broadcasting for the high-speed wireless communication standard 103 are performed from the image forming apparatus 101. In a step S822, according to the settings of No. 2 on Table 2, the image forming apparatus 101 displays the screen 404. With this, in a step S823, the user can quickly select the SSID 01 (SSID 501c) on the terminal 102 and also input the network key 01. In a step S824, the terminal 102 transmits the SSID 01 and the network key 01, which have been selected and input, respectively, in the step S823, to the image forming apparatus 101. In a step S825, the image forming apparatus 101 acquires the SSID 01 and the network key 01, which have been transmitted in the step S824, and compares the SSID 01 and the network key 01 with the settings thereof. In a step S826, the image forming apparatus 101 transmits an ACK signal to the terminal 102. In a step S827, the direct connection between the image forming apparatus 101 and the terminal 102 is completed. In a step S828, the image forming apparatus 101 stops broadcasting for the high-speed wireless communication standard 103 (see a third broken-line arrow BC3D from the top in FIG. 8B).

Next, the operation for disconnecting the direction connection will be described. As shown in FIG. 8B, in a step S829, the user selects the SSID 01 on the terminal 102 and disables the direct connection. In a step S830, the terminal 102 disconnects the direct connection.

Figure 9A:
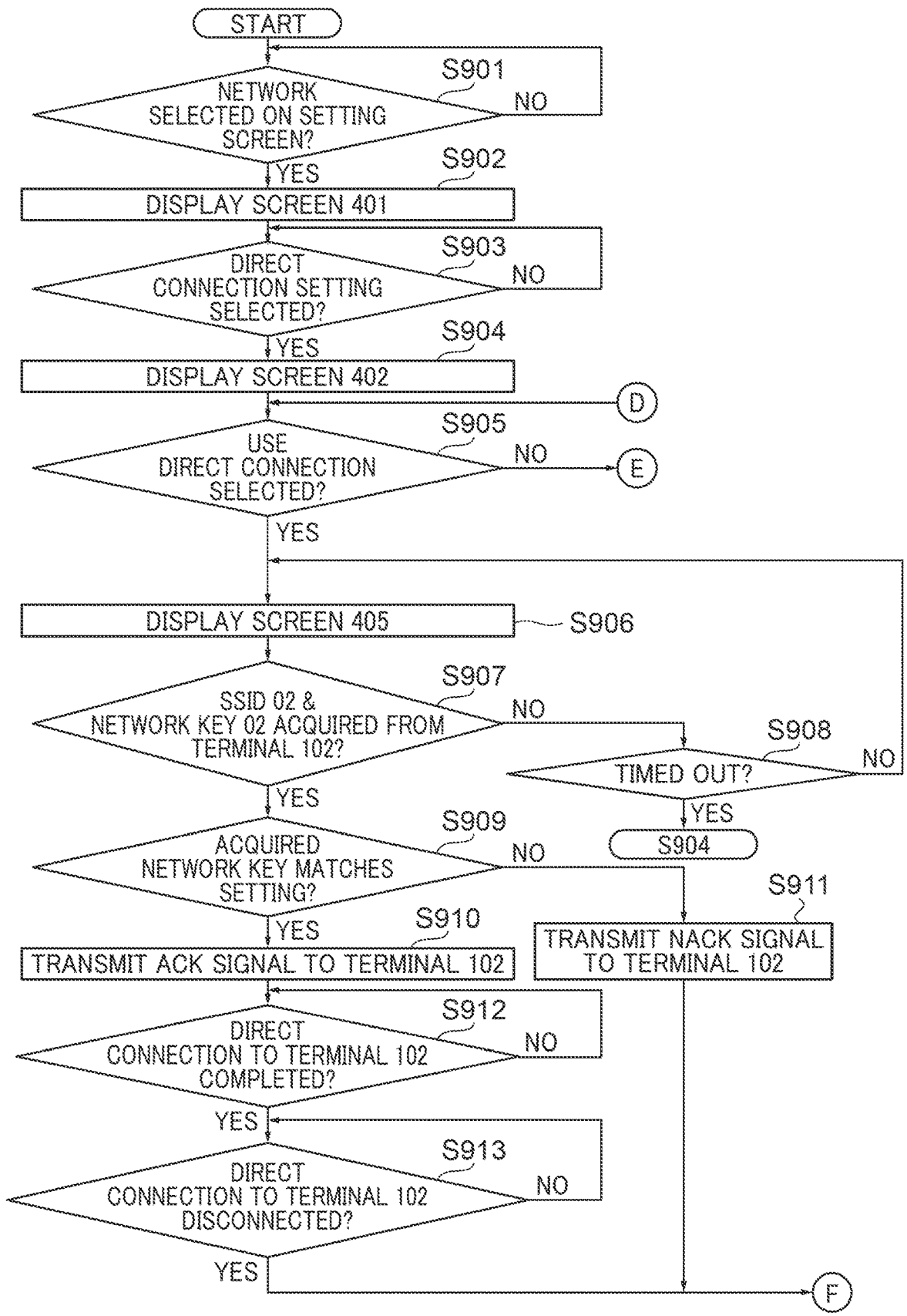
FIG. 9A is a flowchart of the connection and disconnection process performed when the image forming apparatus is connected by direct connection and the direct connection is disconnected, in the second embodiment.
Figure 9B:
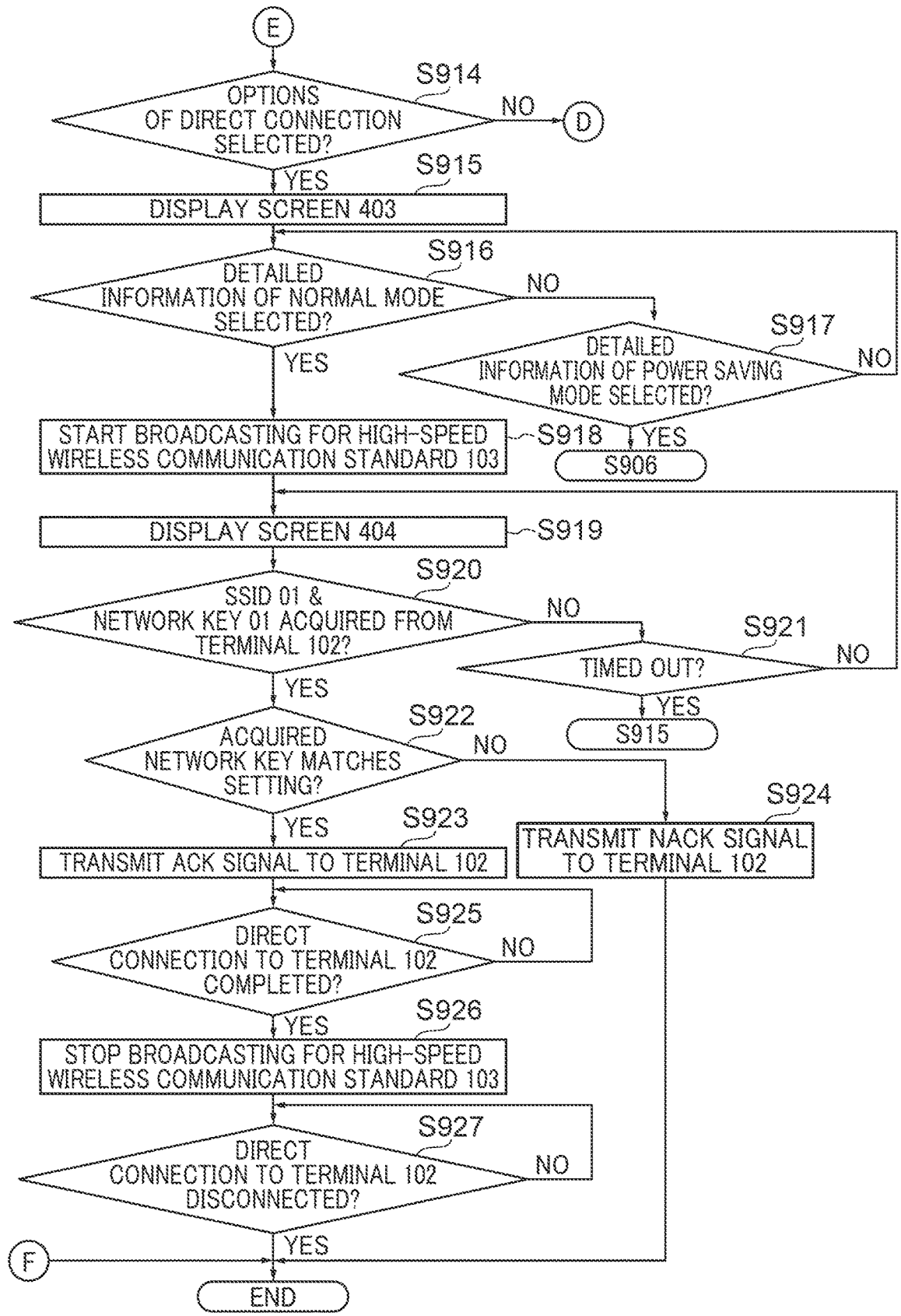
FIG. 9B is a continuation of FIG. 9A.

FIGS. 9A and 9B are a flowchart of the connection and disconnection process performed when the image forming apparatus is connected by direct connection and the direct connection is disconnected. First, direct connection by selecting the selection item 402a (use direct connection) on the screen 402 and disconnection of the direct connection will be described. As shown in FIG. 9A, in a step S901, the controller 201 (CPU 211) of the image forming apparatus 101 determines whether or not "network" has been selected on the setting screen of the image forming apparatus 101. If it is determined in the step S901 that "network" has been selected, the process proceeds to a step S902. On the other hand, if it is determined in the step S901 that "network" has not been selected, the process continues the step S901.

In the step S902, the controller 201 displays the screen 401 on the console section 204.

In a step S903, the controller 201 determines whether or not the selection item 401b (direct connection setting) on the screen 401 has been selected. If it is determined in the step S903 that the selection item 401b has been selected, the process proceeds to a step S904. On the other hand, if it is determined in the step S903 that the selection item 401b has not been selected, the process continues the step S903.

In the step S904, the controller 201 displays the screen 402 on the console section 204.

In a step S905, the controller 201 determines whether or not the selection item 402a (use direct connection) on the screen 402 has been selected. If it is determined in the step S905 that the selection item 402a has been selected, the process proceeds to a step S906. On the other hand, if it is determined in the step S905 that the selection item 402a has not been selected, the process proceeds to a step S914 in FIG. 9B.

In the step S906, the controller 201 displays the screen 405 on the console section 204.

In a step S907, the controller 201 determines whether or not the SSID 02 and the network key 02 have been acquired from the terminal 102. If it is determined in the step S907 that the SSID 02 and the network key 02 have been acquired, the process proceeds to a step S909. On the other hand, if it is determined in the step S907 that the SSID 02 and the network key 02 have not been acquired, the process proceeds to a step S908.

In the step S908, the controller 201 determines whether or not the operation has timed out after the screen 405 is displayed in the step S906. If it is determined in the step S908 that the operation has timed out, the process returns to the step S904. On the other hand, if it is determined in the step S908 that the operation has not timed out, the process returns to the step S906.

In the step S909 after execution of the step S907, the controller 201 determines whether or not the network key 02 acquired in the step S907 and the setting thereof match. If it is determined in the step S909 that there is a match, the process proceeds to a step S910 and then to a step S912. On the other hand, if it is determined in the step S909 that there is no match, the process proceeds to a step S911.

In the step S910, the controller 201 transmits an ACK signal to the terminal 102.

In the step S911, the controller 201 transmits a NACK signal to the terminal 102, followed by terminating the present process.

In a step S912 after execution of the step S910, the controller 201 determines whether or not the direct connection to the terminal 102 is completed. If it is determined in the step S912 that the direct connection is completed, the process proceeds to a step S913. On the other hand, if it is determined in the step S912 that the direct connection is not completed, the process continues the step S912.

In the step S913, the controller 201 determines whether or not the direct connection to the terminal 102 has been disconnected. If it is determined in the step S913 that the direct connection has been disconnected, the present process is terminated. On the other hand, if it is determined in the step S913 that the direct connection has not been disconnected, the process continues the step S913.

Next, direct connection by selecting the selection item 402b (options of direct connection) on the screen 402 and selecting the detailed information 403a of the "normal mode", and disconnection of the direct connection will be described. As shown in FIG. 9B, in the step S914 after execution of the step S905, the controller 201 determines whether or not the selection item 402b (options of direct connection) on the screen 402 has been selected. If it is determined in the step S914 that the selection item 402b has been selected, the process proceeds to a step S915. On the other hand, if it is determined in the step S914 that the selection item 402b has not been selected, the process returns to the step S905 in FIG. 9A.

In the step S915, the controller 201 displays the screen 403 on the console section 204.

In a step S916, the controller 201 determines whether or not the detailed information 403a of the "normal mode" on the screen 403 has been selected. If it is determined in the step S916 that the detailed information 403a has been selected, the process proceeds to a step S918. On the other hand, if it is determined in the step S916 that the detailed information 403a has not been selected, the process proceeds to a step S917.

In the step S917, the controller 201 determines whether or not the detailed information 403b of the "power saving mode" on the screen 403 has been selected. If it is determined in the step S917 that the detailed information 403b has been selected, the process returns to the step S906. On the other hand, if it is determined in the step S917 that the detailed information 403b has not been selected, the process returns to the step S916.

In the step S918, the controller 201 starts broadcasting for the high-speed wireless communication standard 103.

In a step S919, the controller 201 displays the screen 404 on the console section 204.

In a step S920, the controller 201 determines whether or not the SSID 01 and the network key 01 have been acquired from the terminal 102. If it is determined in the step S920 that the SSID 01 and the network key 01 have been acquired, the process proceeds to a step S922. On the other hand, if it is determined in the step S920 that the SSID 01 and the network key 01 have not been acquired, the process proceeds to a step S921.

In the step S921, the controller 201 determines whether or not the operation has timed out after the screen 404 is displayed in the step S919. If it is determined in the step S921 that the operation has timed out, the process returns to the step S915. On the other hand, if it is determined in the step S921 that the operation has not timed out, the process returns to the step S919.

In the step S922 after execution of the step S920, the controller 201 determines whether or not the network key 01 acquired in the step S920 and the setting thereof match. If it is determined in the step S922 that there is a match, the process proceeds to a step S923 and then to a step S925. On the other hand, if it is determined in the step S922 that there is no match, the process proceeds to a step S924.

In the step S923, the controller 201 transmits an ACK signal to the terminal 102.

In the step S924, the controller 201 transmits a NACK signal to the terminal 102, followed by terminating the present process.

In the step S925 after execution of the step S923, the controller 201 determines whether or not the direct connection to the terminal 102 is completed. If it is determined in the step S925 that the direct connection is completed, the process proceeds to a step S926. On the other hand, if it is determined in the step S925 that the direct connection is not completed, the process continues the step S925.

In the step S926, the controller 201 stops broadcasting for the high-speed wireless communication standard 103.

In a step S927, the controller 201 determines whether or not the direct connection to the terminal 102 has been disconnected. If it is determined in the step S927 that the direct connection has been disconnected, the present process is terminated. On the other hand, if it is determined in the step S927 that the direct connection has not been disconnected, the process continues the step S927.

In the present embodiment, the all-time setting can be set by the user in an administrator mode. FIGS. 10A to 10D are diagrams each showing an example of a screen of the administrator mode, which is displayed on the console section of the image forming apparatus in the second embodiment. Here, although the method of setting the normal mode will be described, the same is applied to the method of setting the power saving mode. When the administrator mode is selected via the console section 204 of the image forming apparatus 101, a screen 1001 shown in FIG. 10A is displayed. When direct connection 1001a is selected on the screen 1001, a screen 1002 shown in FIG. 10B is displayed. When a normal mode 1002a, out of the normal mode 1002a and a power saving mode 1002b, is selected on the screen 1002, a screen 1003 shown in FIG. 10C is displayed. On the screen 1003, on/off can be set with respect to a normal mode 1003a and an all-time setting 1003b, respectively. Then, when these settings are made and COMPLETE 1003c on the screen 1003 is selected, a screen 1004 shown in FIG. 10D is displayed. The screen 1004 includes a message 1004a describing that the setting is completed. With these operations, in a case where selection for enabling use of the normal mode is performed, it is possible to select whether or not to always use the normal mode (all-time setting). Similarly, in a case where selection for enabling use of the power saving mode is performed, it is possible to select whether or not to always use the power saving mode (all-time setting). With this, the usability in the communication connection operation is improved.

The present invention has been described heretofore based on the embodiments thereof. However, the present invention is not limited to the above-described embodiments, but it can be practiced in a variety of forms, without departing from the spirit and scope thereof. Further, although in the present embodiment, the case where the information processing apparatus is applied to the image forming apparatus has been described by way of example, the information processing apparatus may be applied not only to the image forming apparatus, but also e.g. to a personal computer.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-085376 filed May 25, 2022, which is hereby incorporated by reference herein in its entirety.

What is claimed is:

1. An information processing apparatus comprising:
   a first communication interface configured to perform wireless communication with a first access point in a first wireless communication mode compliant with IEEE 802.11ah;
   a second communication interface configured to perform wireless communication with a second access point in a second wireless communication mode that performs communication at a higher speed than the first wireless communication mode,
   wherein a wireless communication mode is selectable between the first wireless communication mode and the second wireless communication mode; and
   a processor configured to control, in a state in which the first access point and the second access point have been enabled to perform wireless communication, such that a service set identifier (SSID) of one access point of the first access point or the second access point is broadcast, and an SSID of the other access point is inhibited from being broadcast, wherein:
      in a case where the first wireless communication mode is selected, the SSID of the first access point is broadcast, and the SSID of the second access point is inhibited from being broadcast; and
      in a case where the second wireless communication mode is selected, the SSID of the second access point is broadcast, and the SSID of the first access point is inhibited from being broadcast.

2. The information processing apparatus according to claim 1, wherein the first wireless communication mode is configured to consume a smaller power consumption than the second wireless communication mode.

3. The information processing apparatus according to claim 2, further comprising a user interface configured to allow a user to select whether or not to enable use of each of the first wireless communication mode and the second wireless communication mode.

4. The information processing apparatus according to claim 3, wherein the user interface is configured such that:
in a case where use of the first wireless communication mode is enabled, whether or not to always use the first wireless communication mode is selectable, and
in a case where use of the second wireless communication mode enabled, whether or not to always use the second wireless communication mode is selectable.

5. The information processing apparatus according to claim 1, wherein after performing the control such that the SSID of the first access point is broadcast and the SSID of the second access point is inhibited from being broadcast, the processor changes the control such that the SSID of the second access point is broadcast and the SSID of the first access point is inhibited from being broadcast.

6. The information processing apparatus according to claim 1, wherein after performing the control such that the SSID of the second access point is broadcast and the SSID of the first access point is inhibited from being broadcast, the processor changes the control such that the SSID of the second access point is inhibited from being broadcast.

7. The information processing apparatus according to claim 1, wherein:
the information processing apparatus is configured to form an image, and
a control target for which broadcasting is controlled by the processor is a mobile terminal.

8. A method of controlling an information processing apparatus, comprising:
performing wireless communication with a first access point in a first wireless communication mode compliant with IEEE 802.11ah;
performing wireless communication with a second access point in a second wireless communication mode that performs communication at a higher speed than the first wireless communication mode,
wherein a wireless communication mode is selectable between the first wireless communication mode and the second wireless communication mode; and
performing control, in a state in which the first access point and the second access point have been enabled to perform wireless communication, such that a service set identifier (SSID) of one access point of the first access point or the second access point is broadcast, and an SSID of the other access point is inhibited from being broadcast, wherein:
in a case where the first wireless communication mode is selected, the SSID of the first access point is broadcast, and the SSID of the second access point is inhibited from being broadcast; and
in a case where the second wireless communication mode is selected, the SSID of the second access point is broadcast, and the SSID of the first access point is inhibited from being broadcast.

9. A non-transitory computer-readable storage medium storing a program executable by a computer to execute a method of controlling an information processing apparatus, the method comprising:
performing wireless communication with a first access point in a first wireless communication mode compliant with IEEE 802.11ah;
performing wireless communication with a second access point in a second wireless communication capable of performing mode that performs communication at a higher speed than the first wireless communication mode,
wherein a wireless communication mode is selectable between the first wireless communication mode and the second wireless communication mode; and
performing control, in a state in which the first access point and the second access point have been enabled to perform wireless communication, such that a service set identifier (SSID) of one access point of the first access point or the second access point is broadcast, and an SSID of the other access point is inhibited from being broadcast, wherein:
in a case where the first wireless communication mode is selected, the SSID of the first access point is broadcast, and the SSID of the second access point is inhibited from being broadcast; and
in a case where the second wireless communication mode is selected, the SSID of the second access point is broadcast, and the SSID of the first access point is inhibited from being broadcast.

\* \* \* \* \*